July 22, 1952

W. J. BUDZYNA ET AL 2,604,123

LOOM AND METHOD OF WEAVING

Filed Jan. 19, 1949

INVENTOR.
WALTER J. BUDZYNA
BY MAURICE R. FLAMAND

ATTORNEY

July 22, 1952   W. J. BUDZYNA ET AL   2,604,123
LOOM AND METHOD OF WEAVING
Filed Jan. 19, 1949   13 Sheets-Sheet 2

INVENTOR.
WALTER J. BUDZYNA
BY MAURICE R. FLAMAND

Rodney C. Southworth
ATTORNEY

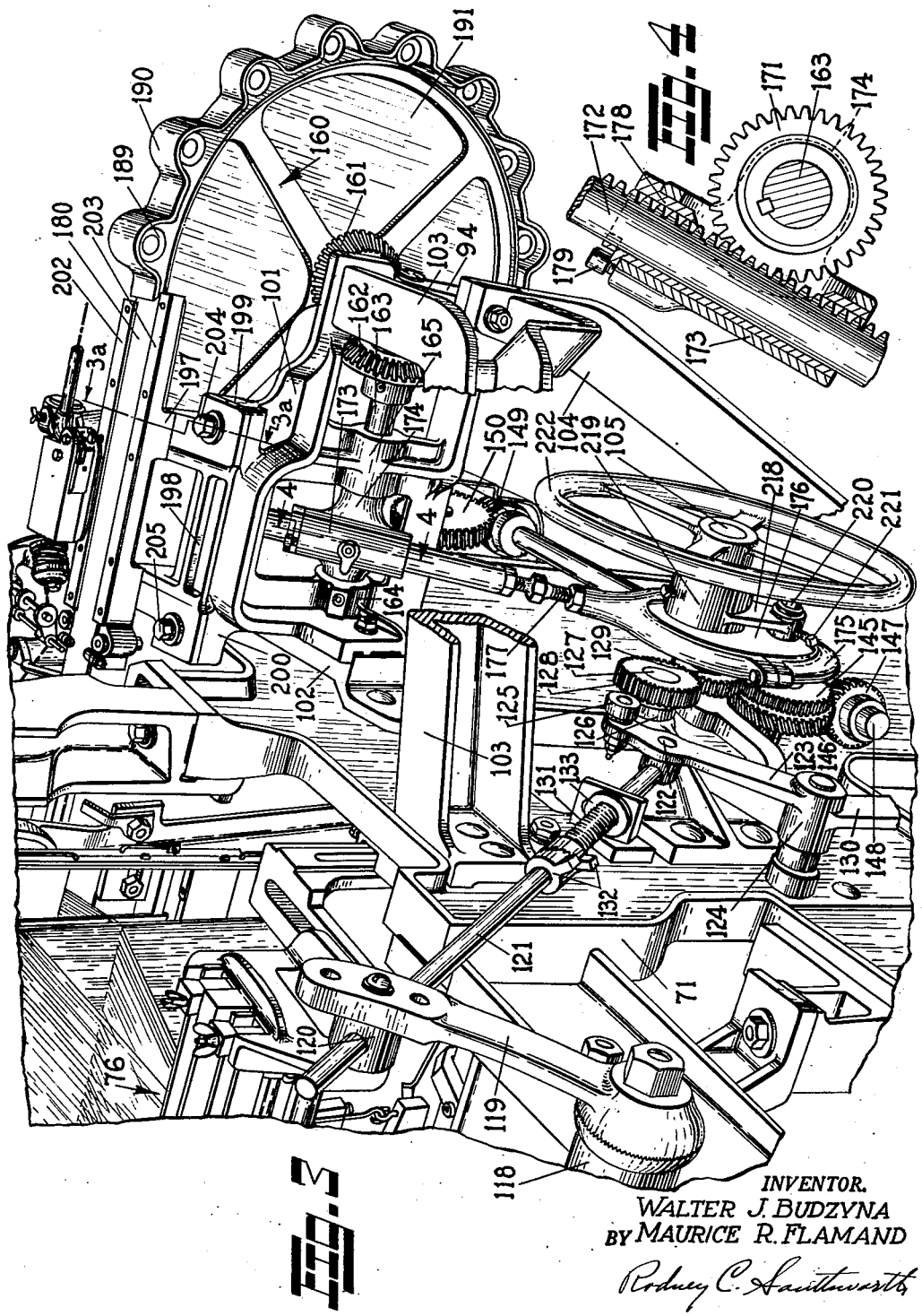

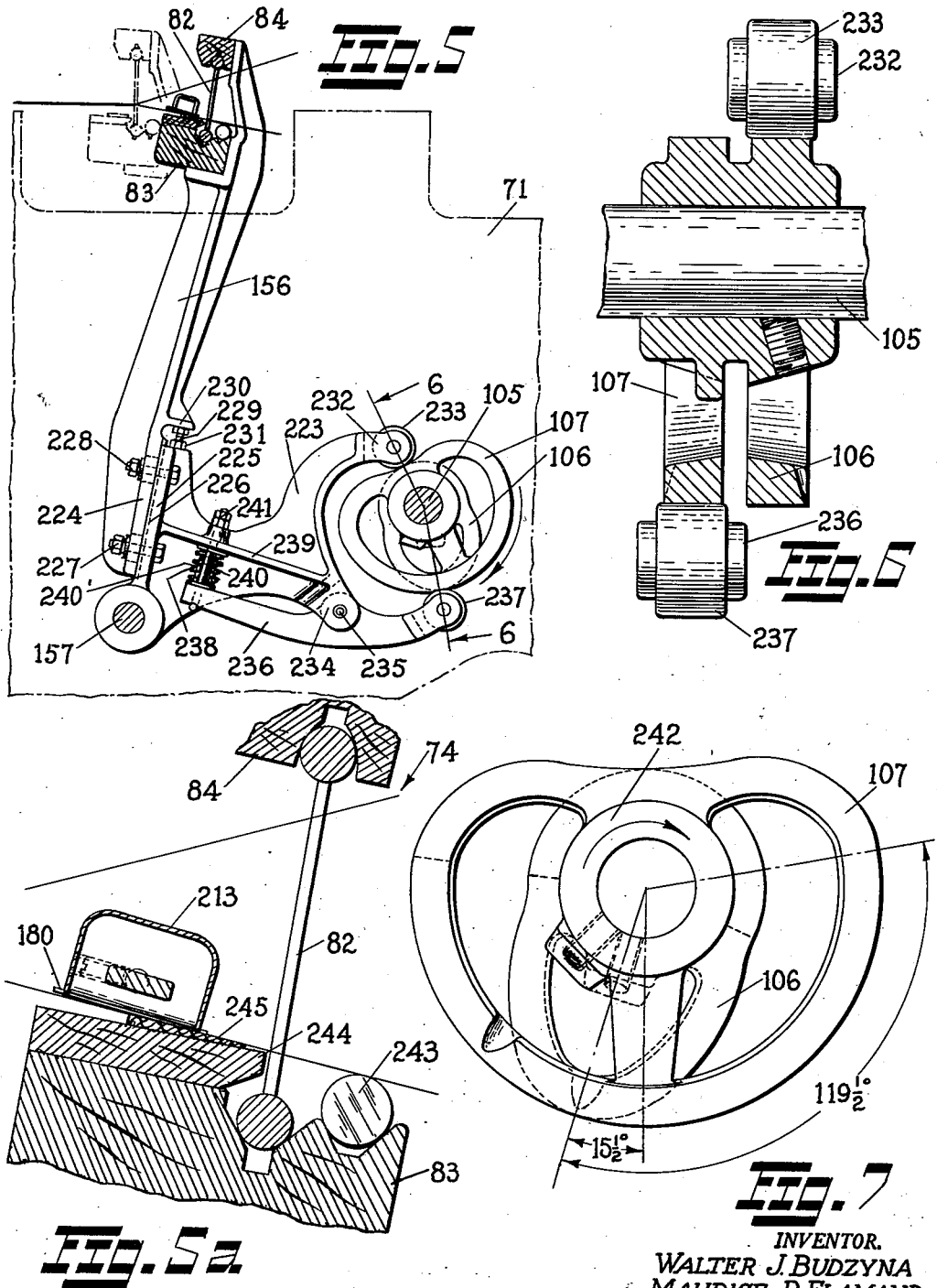

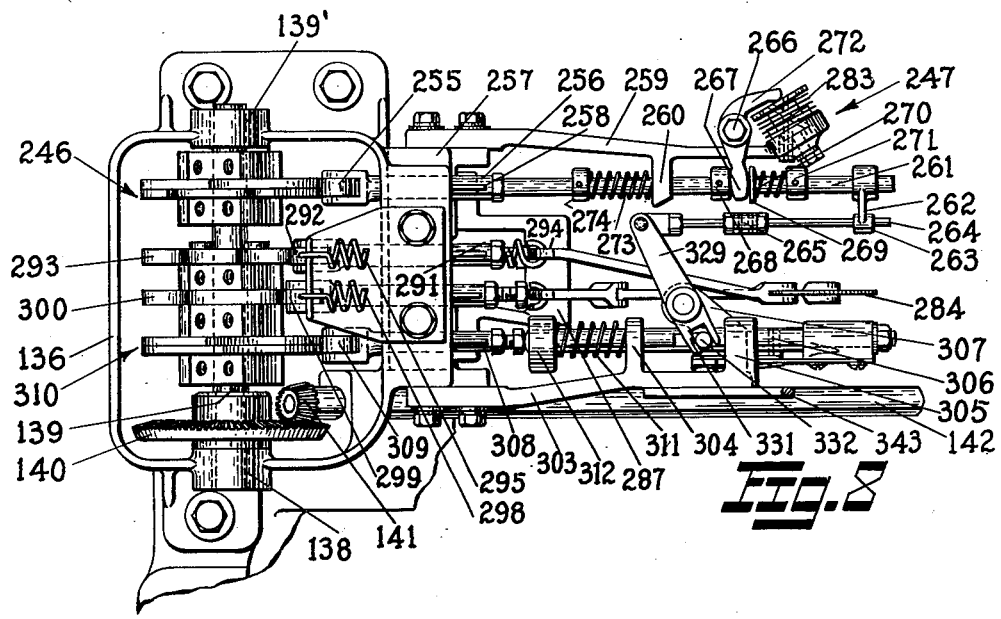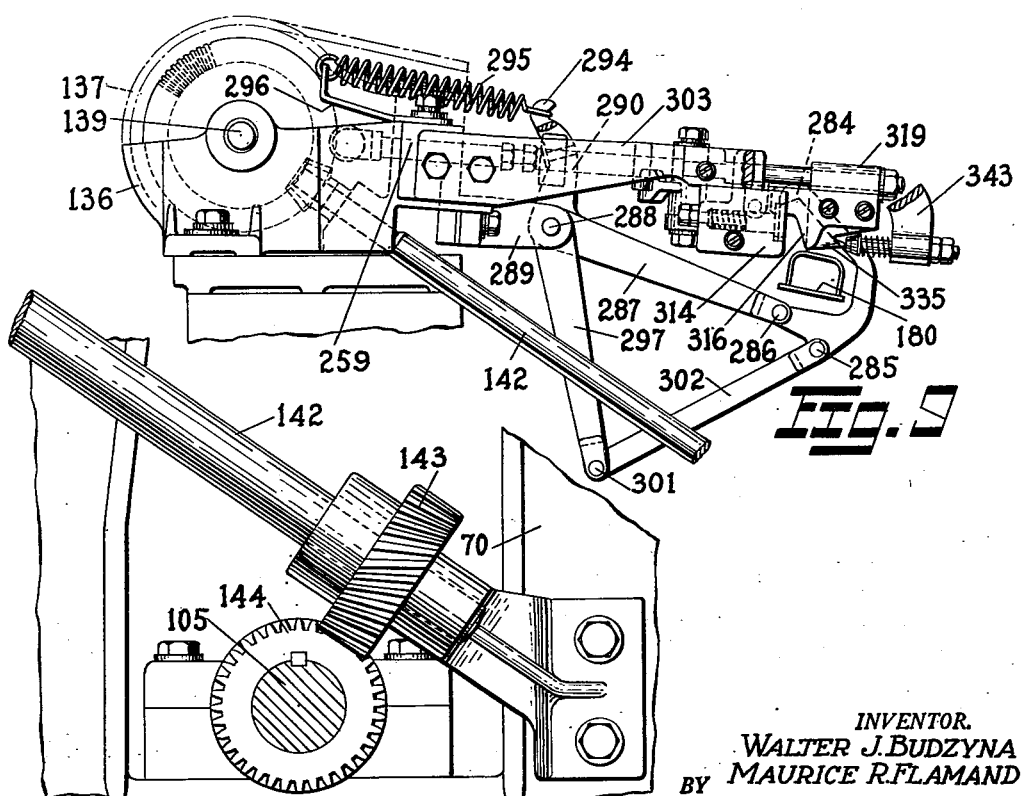

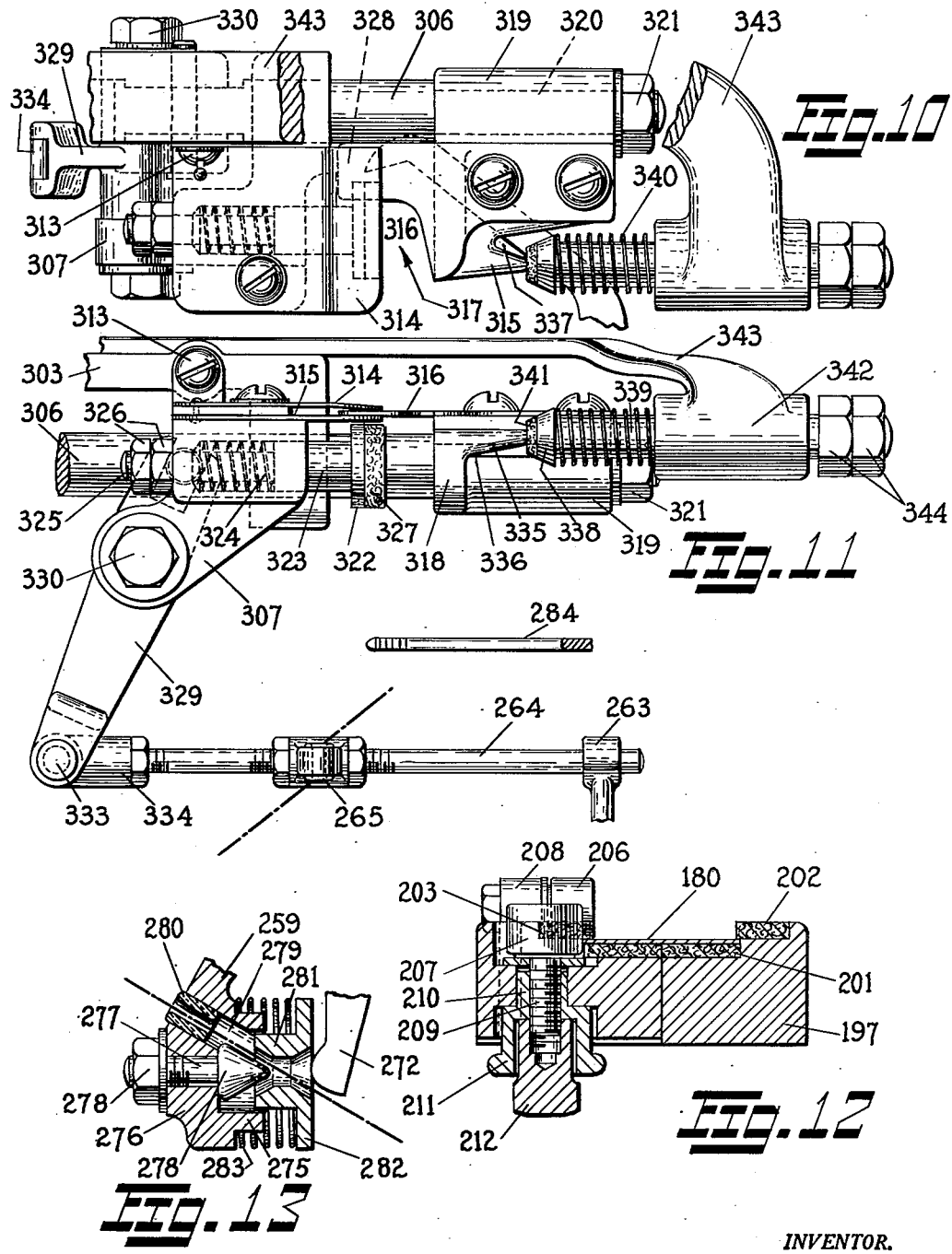

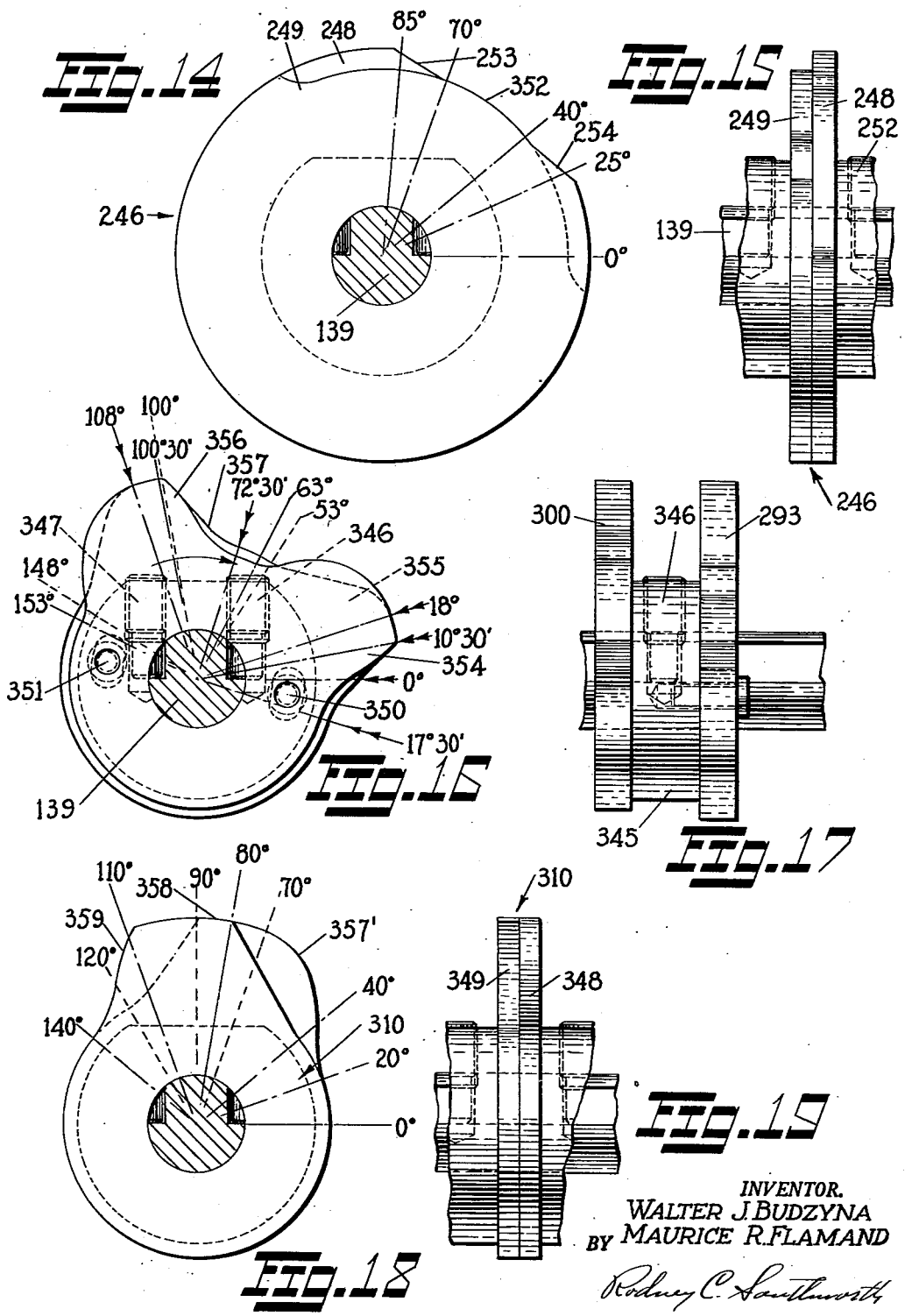

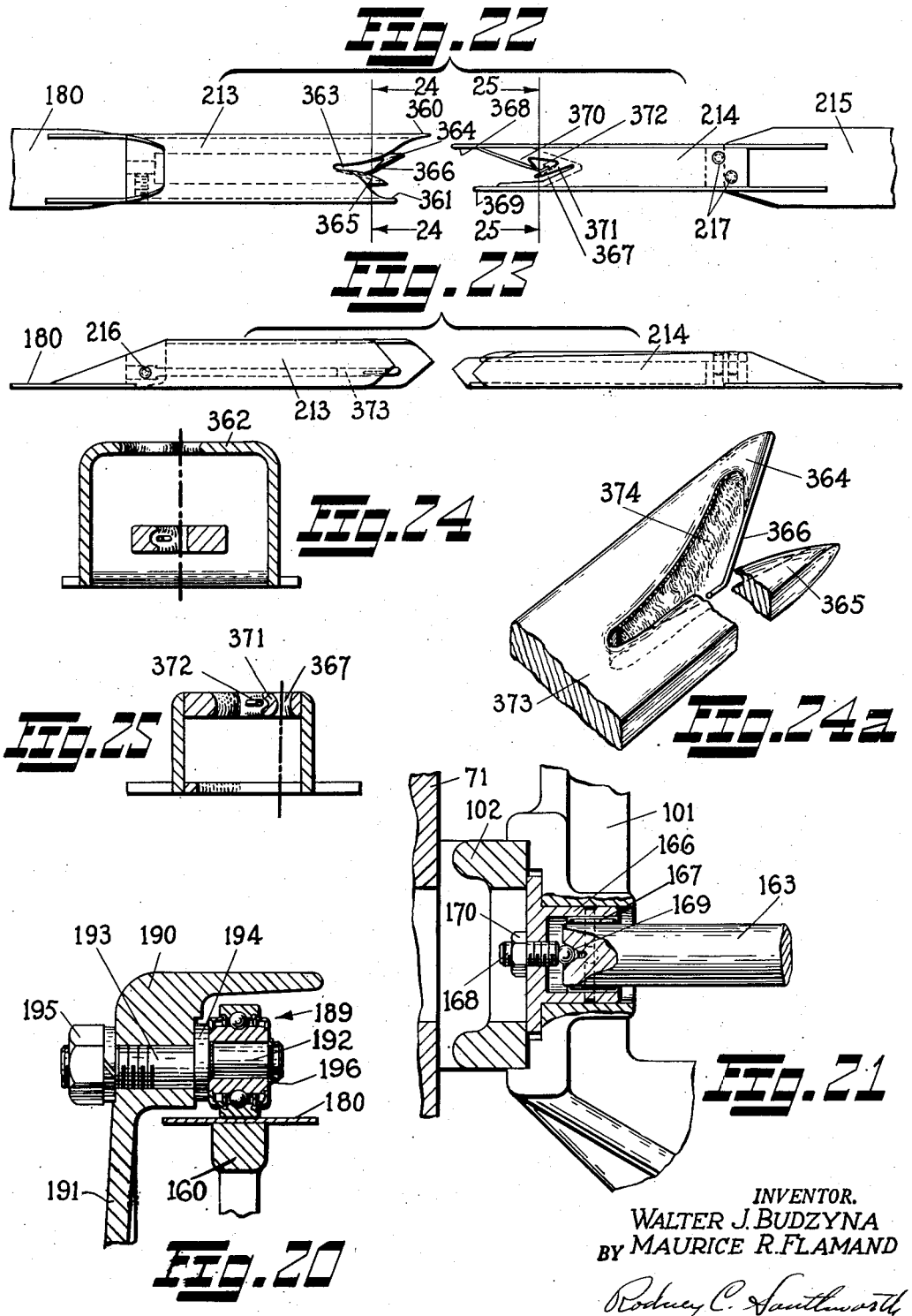

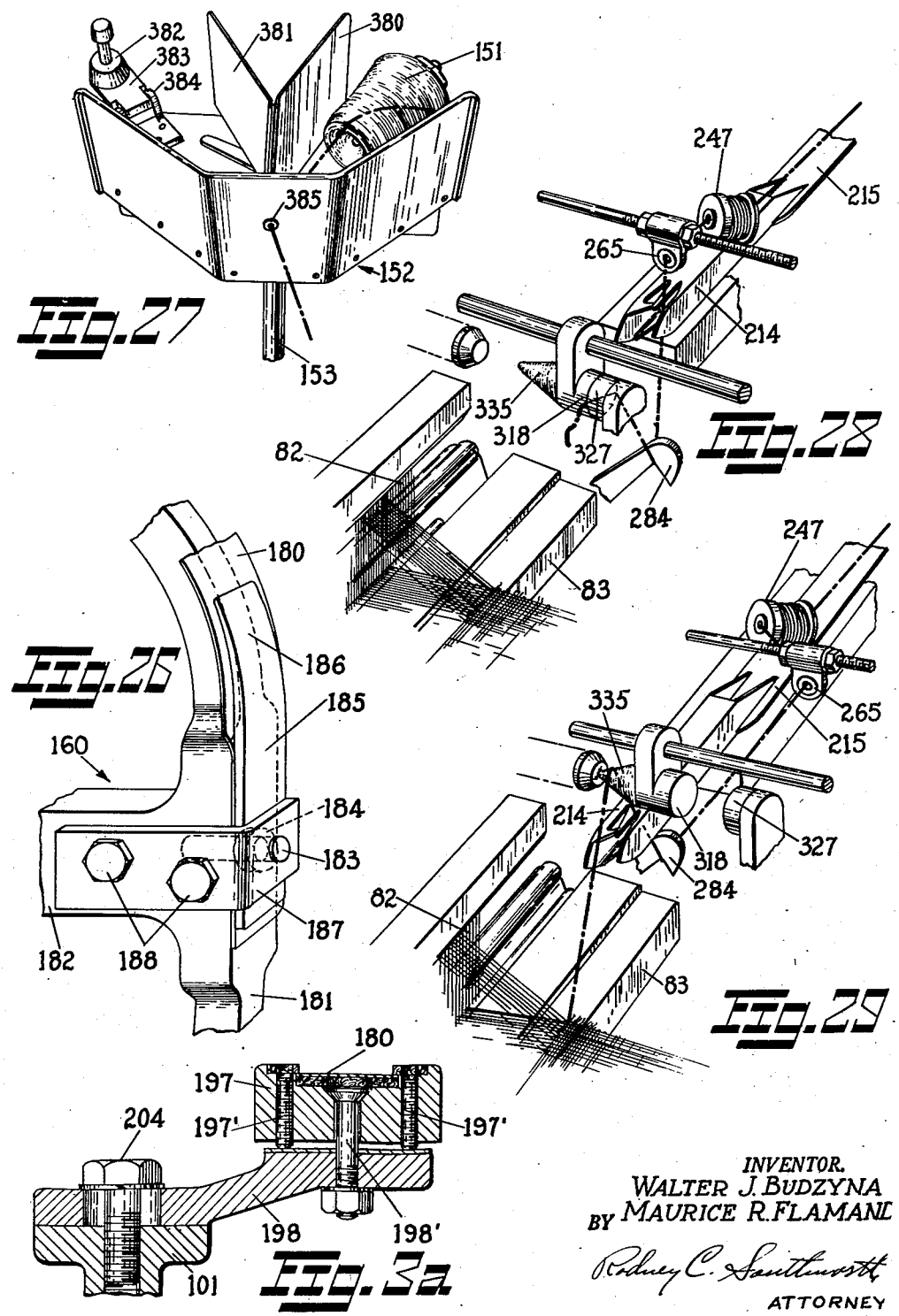

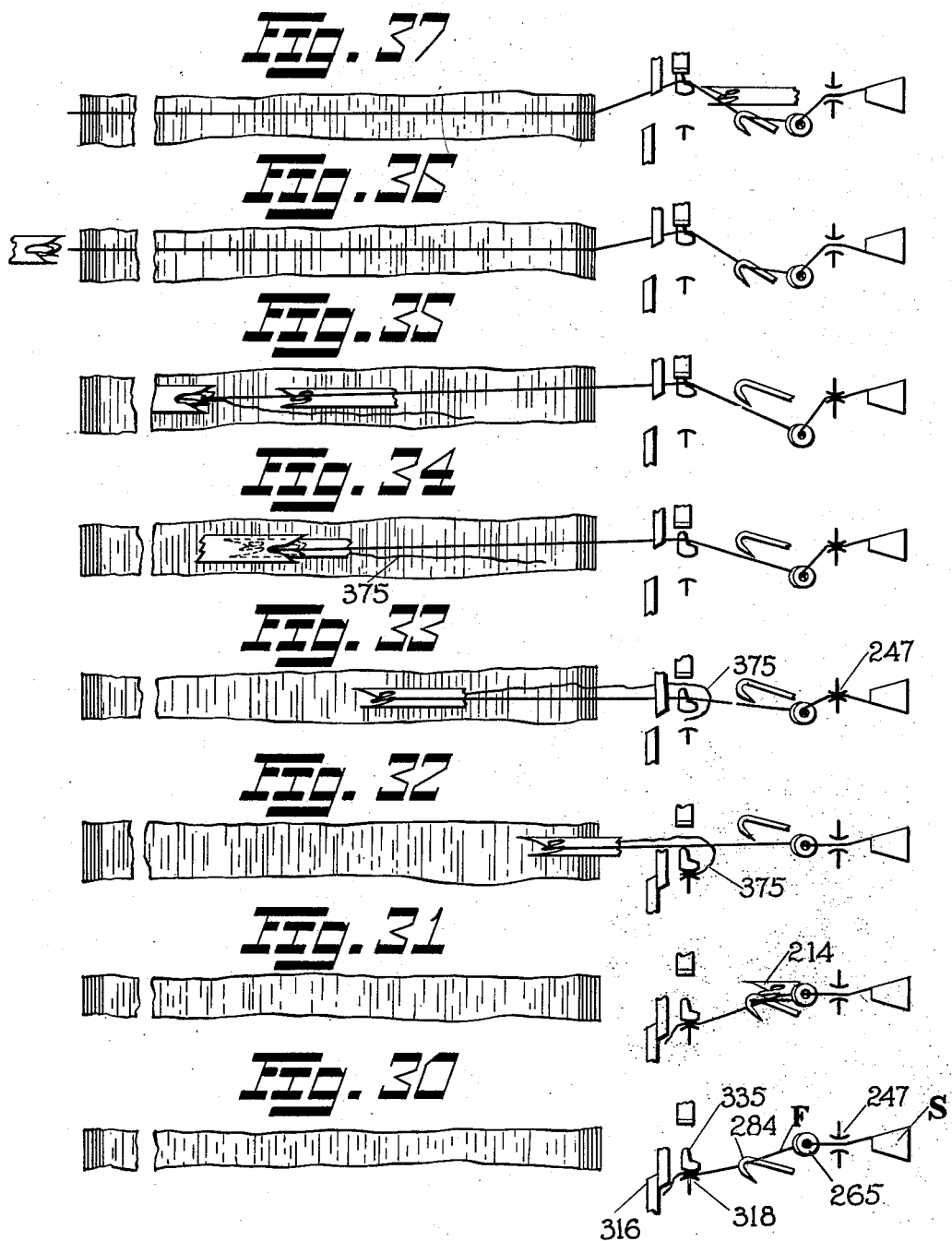

July 22, 1952  W. J. BUDZYNA ET AL  2,604,123
LOOM AND METHOD OF WEAVING
Filed Jan. 19, 1949  13 Sheets-Sheet 11
Fig. 44
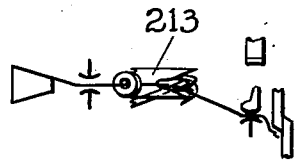
Fig. 43
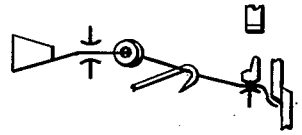
Fig. 42
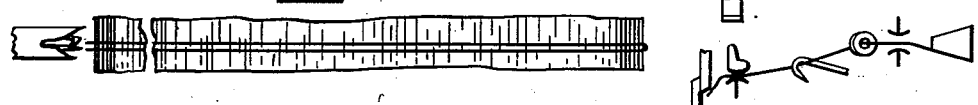
Fig. 41
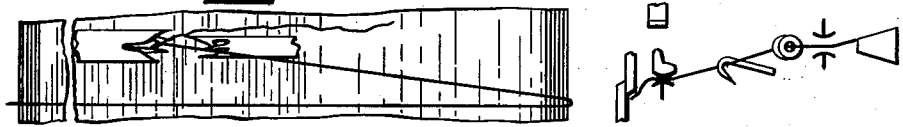
Fig. 40
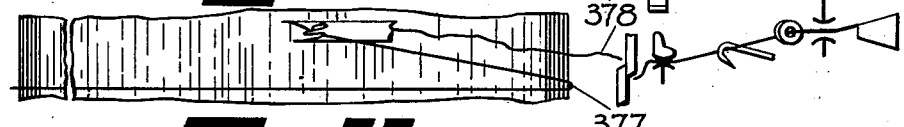
Fig. 39
Fig. 38
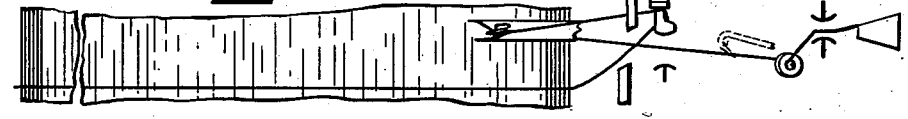
INVENTOR.
WALTER J. BUDZYNA
BY MAURICE R. FLAMAND
Rodney C. Southworth
ATTORNEY

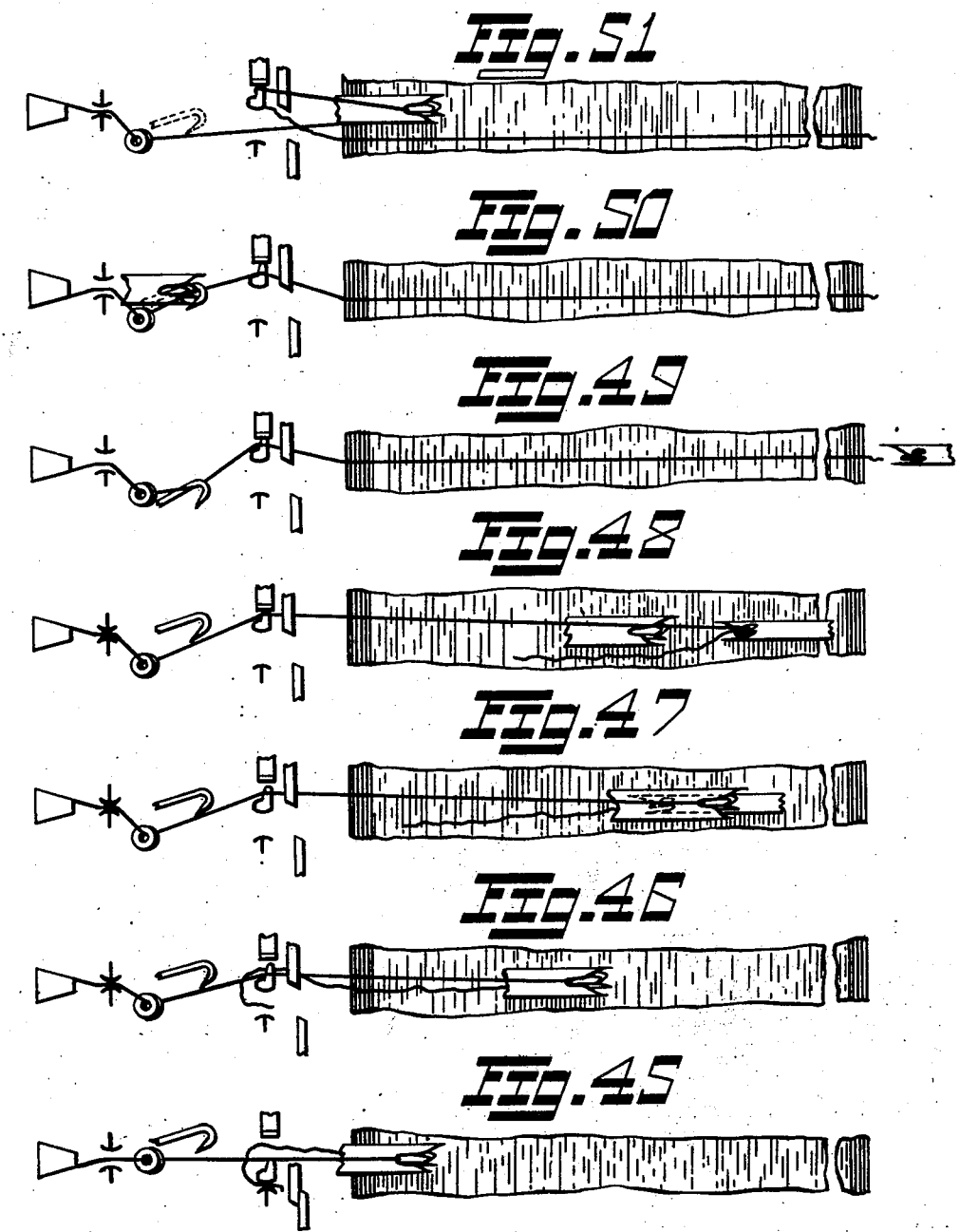

July 22, 1952 W. J. BUDZYNA ET AL 2,604,123
LOOM AND METHOD OF WEAVING
Filed Jan. 19, 1949 13 Sheets-Sheet 13

INVENTOR.
WALTER J. BUDZYNA
BY MAURICE R. FLAMAND
Rodney C. Southworth
ATTORNEY

Patented July 22, 1952

2,604,123

UNITED STATES PATENT OFFICE 2,604,123

LOOM AND METHOD OF WEAVING

Walter J. Budzyna, East Douglas, Mass., and Maurice R. Flamand, Central Falls, R. I., assignors to Draper Corporation, Hopedale, Mass., a corporation of Maine Application January 19, 1949, Serial No. 71,622

63 Claims. (Cl. 139—127)

This invention pertains to looms adapted to function with stationary filling supplies and, more specifically, to shuttleless looms of that type wherein the filling from the stationary supplies is introduced into a warp shed by carriers at the ends of flexible members such as tapes.

It is a general object of the invention to improve looms functioning from stationary supplies of filling and to improve upon a method of operation and mechanism of such looms of the general type known as shuttleless looms.

It is a further object of the invention to simplify looms of the type described and to render them more useful in weaving a greater variety of materials and to decrease the cost of production of the fabric by speeding up the operation of the looms while, at the same time, lessening the possibility of imperfections in the product due to failure in inserting the weft properly.

It is another object to render the entire weaving mechanism of looms of this type more dependable and to obviate possibilities of any great percentage loss in efficiency or of imperfect fabric due to uncertain action of the mechanism in introducing the filling to the inserting means or in transferring the filling from one inserting means to another and continuing its laying in the shed.

It is a further object of the invention to simplify the entire mechanism and to provide for producing selvages of satisfactory type without the addition of any supplementary mechanism expressly for the purpose.

Another object is that of improving looms functioning from stationary filling supplies which, if filling breaks between the filling motion and fabric, will automatically and immediately pick up the filling upon the next pick after breakage and continue to weave in a normal manner.

It is a further and more specific object of the invention to simplify and to render more effective filling motions for looms functioning from stationary filling supplies.

Another object is that of devising a new method of filling handling, that is, a new and improved system of introducing the filling to the carriers of the filling inserting mechanism, and also a new method of transferring the filling from one carrier to another intermediate the ends of the shed into which the filling is laid.

It is a further object of the invention to devise more effective carriers for the filling inserting means to the end that they shall be simpler and more positive in performing their intended function.

A further object is that of improving the drive means for the flexible members and the control of the flexible members themselves so as to speed up the operation of the mechanism without introducing complications, and further to avoid uncertain control by improving the guiding of the flexible members themselves.

It is a further object to improve the lay motion for the loom and to provide for effectively beating the filling into the fabric while permitting the lay to remain stationary throughout a sufficient period of time during the cycle for the filling to be inserted and for the filling inserting mechanism to be withdrawn from the shed.

Other objects of the invention will become apparent from the following disclosure.

Looms have been devised heretofore in which the filling is supplied from stationary sources and include various types of needle looms and also a number of tape looms. For the most part, these looms have either functioned to weave special types of fabrics such as narrow fabrics, or if they have been employed to weave wider or more standard types of fabrics such as are woven on conventional fly shuttle looms, they have functioned slowly and with very mediocre results. Generally the fabrics woven have been of inferior quality and for these and other reasons, shuttleless looms adapted to weave fabrics such as are now produced on the usual fly shuttle looms have not come into practical usage except in a very few instances.

In carrying the invention into effect, as illustrated by the particular embodiment herein disclosed, tape driving mechanism comprising tape wheels enclosed and fixedly mounted at each end of the loom are driven by simplified mechanism including gearing and reciprocating racks. The tapes, one at each side of the loom, are guided so that they register with a lay adapted to dwell throughout an appreciable part of the cycle of operation. The lay which is relatively light and easily reciprocated without setting up excessive inertia forces, merely serves as a means for guiding the warp shed and the tape and filling carriers as the filling is inserted, and to support a reed for beating in the filling. A positively rotated cam mechanism causes the lay to move in a predetermined timed relationship to the movement of other parts for the purpose of beating the filling into the shed, but also causes the lay to dwell throughout about one-half the period of time consumed for a complete cycle incidental to inserting a single pick.

The filling, supplies of which are supported at each end of the loom, is presented to the carrier mechanism at the ends of the tapes by so-called filling motions which are novel and the operation of which will be described in detail hereinafter. These filling motions function to present the filling to the tape heads first in one particular relationship, and then in a different relationship since it is always desired to maintain the so-called loose end or cut end of the filling at the lower side of the tape mechanism so that it is controlled and more safely handled than would otherwise be the case.

It is to be understood that the mechanism, although useful for weaving a relatively great number of different types of fabrics insofar as the particular physical structure or sequence of the inserted picks of filling is concerned, is primarily adapted to introduce the weft or filling in the form of U-shaped or connected pairs of picks, the single picks of which may be inserted from one side and in adjacent warp sheds, or may skip one or more sheds which are occupied by picks inserted from the opposite side of the fabric. These U-shaped, or connected picks of weft are sometimes referred to as "hairpins," and will be so designated in this disclosure.

The invention will be described hereinafter in greater detail by reference to one specific embodiment thereof and certain modifications as evident in the accompanying figures of drawing wherein like parts are indicated by similar numerals and wherein:

Fig. 3 is a view similar to Fig. 2, but taken at the opposite side of the loom and showing the mechanism for driving the tapes, also other parts including a control means for the whip roll and the drive to the fabric take-up.

Fig. 3a is a section taken at line 3a—3a, Fig. 3.

Fig. 4 is a section taken at line 4—4, Fig. 3, and illustrating adjusting means for the tape driving racks.

Fig. 5 is a section transversely through part of the loom showing the lay, rock shaft and details of the lay swords, the rocker arms and the cam and cam follower means by which the lay is swung to and fro.

Fig. 5a is a section showing the lay and parts carried thereby.

Fig. 6 is a section taken at line 6—6, Fig. 5, and showing the details of the cams and cam follower means.

Fig. 7 is a layout of the cams themselves.

Fig. 8 is a plan view of the filling motion employed at the left end of the machine, the cover being removed to show internal parts.

Fig. 9 is an elevation of the mechanism shown in Fig. 8.

Fig. 9a is a section through the main cam shaft showing the drive take-off for the filling motions.

Fig. 10 is an elevation showing certain parts of the inner binder and cutter and a trap for the filling thread.

Fig. 11 is a bottom view of the parts shown in Fig. 10.

Fig. 12 is a section taken through a guiding means for the tapes.

Fig. 13 is a section showing details of a binder for the filling thread which functions to lock that thread as it is drawn from the supply at certain periods during the cycle.

Fig. 14 is a layout view of the cams which function to open and close the binder of Fig. 13.

Fig. 15 is a view showing these cams in elevation.

Fig. 16 is a view showing the layout of cams which function to control a filling thread depressor, also an adjusting means for these cams, it being understood that similar adjusting means may be employed for the other cams, although not illustrated in detail at the other figures.

Fig. 17 is an elevation of the cams of Fig. 16.

Figs. 18 and 19 are similar views showing a cam which functions to control the combined binder and cutter and trap, and also, through certain interconnecting means, a filling thread guiding eyelet.

Fig. 20 is a section of a fragment of the tape, tape wheel enclosing or guard means therefor and the antifriction tape guiding devices several of which are spaced about the tape as it passes around the wheel.

Fig. 21 is a section of a part of the tape driving means showing an end bearing and adjustment therefor.

Fig. 22 is a plan view showing both filling carriers in position for the smaller to enter the larger.

Fig. 23 is an elevation of the carriers shown in plan, Fig. 22.

Fig. 24 is a section taken at line 24—24, Fig. 22.

Fig. 24a is a perspective, fragmentary view of one of the grippers which forms a part of a filling carrier.

Fig. 25 is a section taken at line 25—25, Fig. 22.

Fig. 26 is a perspective view showing the means by which a tape is connected to its tape wheel.

Fig. 27 is a perspective view showing details of one of the filling supply holders.

Fig. 28 is a perspective view showing the filling and the appurtenant parts at the filling motion which position it for being taken at the first pick of a "hairpin."

Fig. 29 is a similar perspective view showing the same parts and the filling, and the position occupied thereby for the second pick of a "hairpin."

Figs. 30 through 42 are diagrammatic views showing the progressive steps in the introduction of a complete "hairpin," the various parts which function upon the filling thread being diagrammatically illustrated in the different positions which they occupy incidental to the carrying out of that part of a cycle.

Figs. 43 through 55 are similar views showing the steps incidental to the introduction of a second complete "hairpin," but being taken from the left side of the machine whereas the first series of views pertain to introduction of filling from the right hand side of the machine.

Now by reference to the accompanying figures of drawing, a preferred form which the invention may take will be described in detail, and for purposes of rendering the description more easily followed, certain functions and parts incidental to those functions are designated by separate headings and described thereunder.

*General machine organization*

Figure 1:
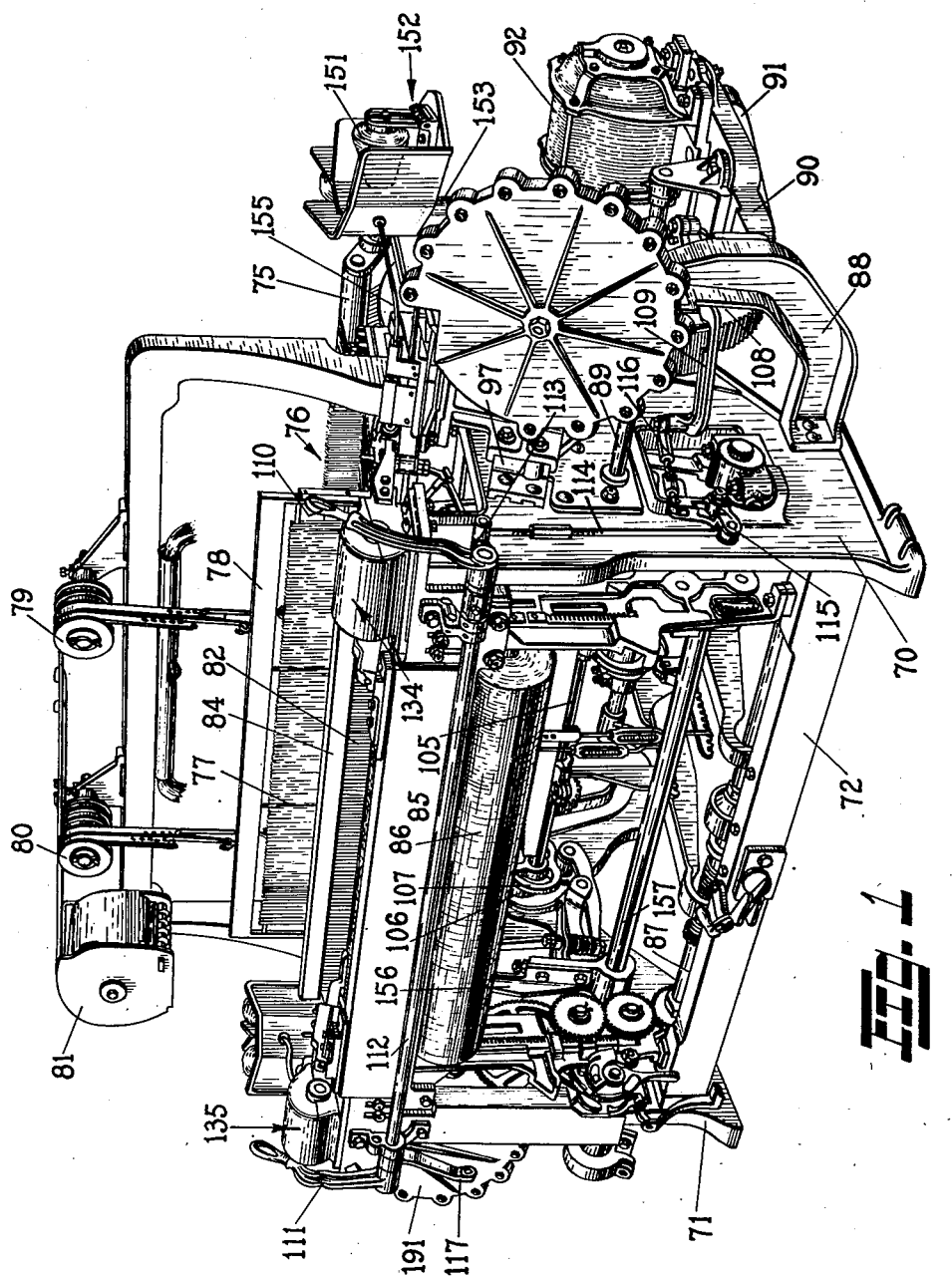
Fig. 1 is a perspective view taken from the front, right end of a loom to which the invention has been applied.
Figure 2:
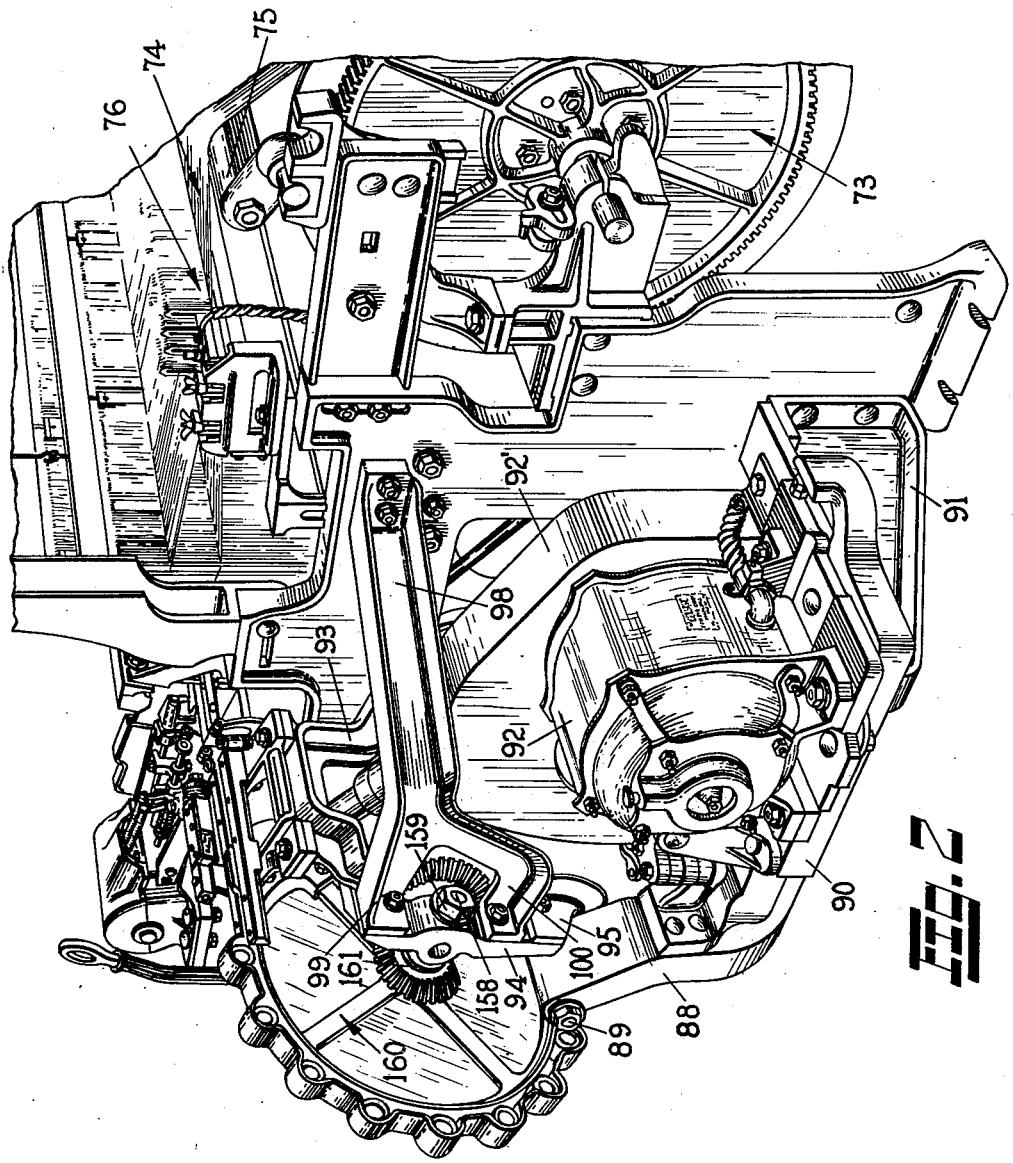
Fig. 2 is a perspective view taken obliquely from the rear, right hand end of the loom showing the tape drive mechanism and other parts at that end of the loom.

Now referring to Figs. 1, 2 and 3, the invention has been applied to a loom, many of the parts of which are of more or less conventional design and it is to be understood that those parts of the loom may be of any desired construction since they have no particular connection to the tapes, the tape drives, or to the lay and the filling motions which function in cooperation therewith. The end frames 70 and 71 of somewhat standard construction have been modified only insofar as is necessary to support the different structures incidental to the invention, and these end frames are separated by the usual cross girts such as the front, bottom girt 72. As shown in Fig. 2, a warp beam generally designated by numeral 73 carries a supply of warp threads 74 which are drawn from that beam and pass over a whip roll 75 which is specially controlled as will hereinafter be described. The warp beam may be rotated or may be permitted to rotate by any convenient let off motion (not shown).

After passing over the whip roll, the warp threads are threaded through a conventional stop motion generally designated by numeral 76 and then through heddles 77 in harness frames 78, these frames herein numbering only two, although it is possible to employ any convenient number such as might be used in a single shuttle loom. The frames are connected through the conventional hooks and harness straps running over sheaves 79 and 80 on the arch, and are drawn upwardly by springs (not shown) but enclosed in housing 81. Positive movement is imparted to the heddle assemblies by the usual cams, treadles and appurtenant harness parts, these all being of standard construction and not necessary of further description at this point.

After being threaded through the heddles, the warp threads pass through a reed 82 secured in the lay beam 83 and hand rail 84, Figs. 5 and 5a. The fabric formed after insertion of the filling and beating it into the shed is drawn toward the front of the loom to be taken up by the usual mechanism including a friction or sand roll positioned just behind the breast beam 85, and is then wound on a fabric roll. A roll of fabric 86 is shown in place and is maintained in contact with the sand roll by the usual cloth roll stand mechanism including the spring shaft 87 and appurtenant parts. The fabric may be let back by mechanism shown in Fig. 1, but which need not be described here.

At the right hand end of the loom, Fig. 2, a bracket 88 is attached to the lower part of the adjacent loomside and extends upwardly being braced to the loomside at its upper end through a tie rod 89. A motor platform 90 is connected at its forward end to the bracket 88 and is supported at its rearmost end by a second bracket 91 which is in turn connected to the loomside as shown. A motor 92 of specified type is attached to the motor platform 90 and through certain interconnected gearing enclosed within the casing 92', drives the various parts of the loom mechanism.

A generally rectangular supporting casting or bracket 93 extends outwardly from the loomside and has a vertical portion indicated by numeral 94 which extends downwardly and connects to or is supported by a curved connector 95 fixed to the lower end of the vertical portion 94 and attached at the inner side of the bracket 88. At its inner end, this casting 93 is adjustably attached to a slide 97, Fig. 1, bolted to the loomside and angularly positioned so as to be perpendicular to a plane through the tape wheel, later to be described. It is to be understood that all of the braces and supporting mechanism for the motor and for the tape wheel and tape supporting structures are provided for a definite range of adjustment so that the parts may be properly positioned and may function in proper relationship to other cooperating elements in the loom.

A horizontally disposed brace 98 is attached at its inner end to the loomside and is forked at its outer end, one fork end 99 being connected adjacent the upper end of the vertical portion 94 of rectangular bracket 93 while the lower fork portion 100 connects to a point more nearly at the lower end of that particular element and just above the upper end of the curved connector 95. The bracket 93 serves to support the tape wheel at the right hand side of the machine and also the tape guiding mechanism adjacent thereto.

Now referring to Fig. 3, the opposite tape wheel and tape guiding members are supported by means very similar to that described with respect to Fig. 2. The left hand side of the loom is simpler in that there is no need for supporting the motor, clutch, gearing and other parts which are preferably to be found at the right hand side. At the left hand side the support for the tape wheel and tape guiding means is evident in a bracket 101, similar to the bracket 93 at the opposite side, and which is maintained in position by an adjustable, sliding attachment to an inclined guide 102 bolted to the loomside 71, and a horizontal brace 103 similar to the brace 98 at the other side, and in addition thereto, a more or less vertically disposed brace 104. This brace 104 is somewhat similar to brace 88, but is not so heavy nor is it quite as complicated since it serves no other purpose than to strengthen the support for the parts held on bracket 101.

Now referring to Figs. 1, 2, 3 and 5-7, a cam shaft 105 is supported in suitable bearings in the loomsides and carries adjacent the inner face of each loomside a pair of cams designated by numerals 106 and 107. These cams, better shown in Figs. 5-7, and which will be described in greater detail hereinafter, are fixed to the cam shaft to rotate therewith and serve to impart the necessary movement to the lay, reed, etc. The cam shaft itself is driven through a clutch and gearing from the motor 92, that motor having on its rotating shaft a pinion (not shown) which meshes with the gear 108, Fig. 1, and which is connected through to the cam shaft itself by a clutch. The clutch (not shown) is of conventional construction and similar to that commonly employed in looms and is controlled through a clutch shifter arm 109.

The actual control for stopping and starting the machine is derived from certain hand levers designated by numerals 110 and 111, one at each end of the machine. These levers are fixed at the ends of a shaft 112 rotatable in bearings adjacent each of its ends. The right hand end of the shaft 112 has an arm 113 fixed thereto to the free end of which is connected a depending link 114 attached at its lower end to one arm of a bell crank lever 115. This lever 115 is pivoted at the loomside 70 and connects through a link 116 attached to the other arm of lever 115 to the clutch shifter 109 so that whenever either of the hand levers 110 or 111 is moved in the appropriate direction, the clutch may be engaged or disengaged as desired.

A depending arm 117 fixed adjacent the left hand end of shaft 112 strikes a contact member through which the warp stop motion may be deenergized as the machine is stopped. Upon starting the machine again, the circuit for the warp stop motion will automatically be completed and thus, the stop motion itself will automatically be connected within its circuit or disconnected as the machine is stopped and started.

While it forms no part of the present invention, a constant tension warp let-off is preferably employed, and the essential control parts therefor are illustrated in Fig. 3. The pivot for the whip roll is shown at 118 and adjustably attached to that pivot is an arm 119 to the free end of which is connected a pivot 120 for the upper end of link or rod 121 which extends downwardly to attach at 122 to one arm 123 of a two-arm lever pivoted at 124 to the loomside. Arm 123 extends to a point slightly beyond the pivot 122 and carries a freely rotatable cam follower 125 engageable with a cam 126 fixed to a shaft 127 on which is also fixedly mounted a gear 128. Gear 128 meshes with a pinion 129 fixed to the main cam shaft 105.

The motion derived from movement of the arm 123 as influenced by the cam 126 is conveyed through the other arm 130 of the lever to a let-off mechanism of any convenient type, that particular part of the device not being necessary of further description here. The general tendency of the warp sheet under tension is to maintain the follower 125 in contact with the cam against the tension of a spring 131 compressed between stop collars 132 on rod 121 and an abutment 133 which is fixed to the loomside or to any other convenient fixed support. As tension increases in the warp sheet, the whip roll is drawn downwardly thereby compressing spring 131 so that the cam 126 will, upon each revolution of the cam shaft, contact the follower 125 and through the arms 123 and 130, will become effective to impart a greater or lesser movement to the let-off in accordance with the tension in the warp sheet. As tension is relieved, the opposite takes place and the action of the let-off becomes substantially less, or possibly, there will be no movement thereof until a satisfactory tension condition has been reestablished. Normally the spring 131 is maintained under such tension that practically the same amount of let-off movement is imparted as the follower 125 is contacted by a small part of the periphery of cam 126 upon each rotation of the cam shaft.

Now referring to Figs. 1, 2, 3, 8, 9 and 9a, at either end of the front portion of the loom frame are supported filling motions generally indicated by numerals 134 at the right hand side of the machine and 135 at the left. These filling motions are mounted on pads machined on the ends of the breast beam 85 just above those points at which the breast beam is bolted to the front, top portion of the loomsides. These filling motions which are to be described in greater detail in later paragraphs are enclosed within suitable casings and are to a great extent, self-contained or unitary in that they may be bodily removed and replaced and that each is driven through its own drive means directly from the main cam shaft.

Referring to Figs. 8 and 9, a filling motion, that illustrated in these figures being the one at the left hand side of the machine, although they are substantially identical except for the fact that they are fabricated as rights and lefts, comprises as a lower support member, the casing 136 to which is attached a cover 137 and, within certain bearings 138 and 139' at the ends of the casing, a freely rotatable shaft upon which are mounted certain cams hereinafter to be described in detail. Shaft 139, hereinafter referred to as a filling motion cam shaft, also has fixedly connected thereto a bevel gear 140 with which meshes a bevel pinion 141 fixed to the upper, forward end of a downwardly inclined drive shaft 142. This drive shaft 142 is suitably borne within the interior space between the loomsides and is driven at its lower end through spiral gearing one of which is fixed at that end of the shaft 142 and the other of which is rotatable with the main cam shaft. This gear drive from the main cam shaft is duplicated at each end and thus, each of the filling motions is simultaneously driven in synchronism with the other functioning parts of the machine. These gears are shown in detail in Fig. 9a, the spiral gear 143 being attached to the end of shaft 142 and driven from a corresponding gear 144 keyed or otherwise fixed to the main cam shaft 105.

As shown in Fig. 3, the fabric take up is also driven from the main cam shaft through a gear 145 meshing with the pinion 129 and spiral gears 146 and 147, the latter being fixed at one end of a shaft 148 which runs forwardly to a point adjacent the take up gearing which is driven thereby through a worm 149 and worm wheel 150. The worm wheel 150 is fixed to a short shaft which extends through the loomside and from which the conventional gears employed to advance the take up receive their movement.

At each end of the machine the filling supply which may take the form of any of the well known self-sustaining thread packages, one of which is indicated by the numeral 151 is carried in a holder generally indicated by numeral 152 supported on a post 153 which is in turn fixed to some convenient, adjacent part of the machine. The filling is drawn through a tube 155 extending from the holder to the adjacent filling motion. There are preferably two filling supplies 151 in each holder. These filling supplies are interconnected by tying together the tail end of the package from which filling is being drawn with leading end to be drawn off from the accompanying package so that when the first supply is exhausted, the loom will continue to weave since it may immediately draw from the second supply. Since each of the filling supplies is extremely large as compared to the ordinary shuttle bobbin utilized in fly shuttle looms, a relatively great period of time elapses between the initial introduction of filling from a fresh source and the exhaustion of filling from that source, and, since there are two, at least, of the sources available at each end of the machine, the necessity for replacing a filling package comes only at extreme intervals as compared to the necessity of frequent replenishment in conventional loom batteries. The amount of labor required is, of course, greatly lessened by employment of an outside source of filling, and the skill required, the necessary care to be exercised, and the actual physical effort involved is only a small fraction of that required in maintaining the bobbin batteries or shuttles in other types of looms.

The lay briefly mentioned above is adapted to rock to and fro as influenced by the cams above mentioned and which will be described in greater detail in a later paragraph is attached adjacent the upper ends of lay swords 156 which rock about a rock shaft 157, Figs. 1 and 5. Preferably, two lay swords are employed and the cams are duplicated at each end of the cam shaft 105. The movement of the lay and of the reed will be described more fully in a following paragraph and details with respect to adjustments and other important features will be discussed at that time.

*Tape mechanisms and tape wheel drives*

Now referring to Figs. 1, 2 and 3, and more specially to Fig. 3, the tape wheel and guiding mechanism, also the drive means therefor, will be described. The mechanism with which we are concerned at this point is duplicated at each end of the machine and a description of that at one end, the left hand end as shown in Fig. 3, should suffice for an understanding of what is also to be found at the opposite end. In some instances parts are shown more clearly in Fig. 2, the right hand end, than in Fig. 3, and for that reason reference to some elements is made and the reference numerals applicable thereto are to be found at that side.

The bracket 93 and 101 have adjacent their outer ends at the vertical portion 94, Fig. 2, thereof, a bearing through which passes a stud 158, this stud being shouldered and held in position in the bracket by a nut 159. The projecting part of the stud forms a bearing for a tape wheel 160 which is adapted to rotate freely on the stud, or on an antifriction bearing thereon if desired, and this tape wheel is preferably made of aluminum or some light alloy since the strength required is not great and since it is to reciprocate rapidly to and fro, thereby making reduction of its mass very desirable. A bevel gear 161 is attached to the hub of the tape wheel and meshes with a second similar bevel gear 162 mounted on a horizontal shaft 163 carried in bearings 164 at the inner end, 165 intermediate the ends of the shaft, and having its outer end projecting into an aperture or bearing at the outer portion 94 of the bracket 101 or 93, as the case may be.

Now referring to Fig. 21, the shaft 163 and the detailed construction of the bearings at its inner end are illustrated. The bracket 101 is slidably mounted upon the inclined slide 102 which is bolted securely to the loomside 71. The bracket is counterbored for the reception of a bushing 166 which is shouldered and retained within the counterbored aperture in the bracket by means of screws or in any other satisfactory manner. A needle bearing 167, or other antifriction bearing, is preferably employed for the end of the shaft and thrust or positioning of the shaft axially so that the bevel gears 161 and 162 mesh properly is taken care of by an adjustable screw 168 against which bears the ball 169 retained within a conical bearing at the end of the shaft in alignment with the screw 168. The position of the parts is determined by applying a screw driver through an opening at the inside of the loomside and when properly adjusted the parts are locked in position by nut 170.

Needle bearings may also be employed at the center support 165 and at the outer bearing, it being understood that other antifriction bearings, or in some instances, plain bushings properly lubricated may be used as an alternative. The outer end of the shaft 163 stops just short of the stud 158 which supports the tape wheel, and the bearing, of course, is at the inside of the bracket so that the end of the shaft and the bearing do not interfere with the said stud.

Between the bearings 164 and 165, a pinion 171, Fig. 4, is keyed to the shaft 163, that pinion being engaged by teeth on a rack 172, said rack being of circular cross section and adapted to slide within a sleeve portion 173 of a swivelling guide member having hubs 174 which are concentrically disposed to the shaft 163. The rack 172 projects through the sleeve 173 and extends downwardly and attaches to an eccentric strap 175 which is engaged about an eccentric sheave 176 fixed to the main cam shaft 105. A connecting stud 177 is threaded into the rack and also into the eccentric strap and having right and left hand threads at opposite ends, may be turned by applying a wrench to the central portion thereof and when properly adjusted is locked in position by the lock nuts, one at one end and the other at the other end. The adjustment of this stud tends to lengthen or shorten the distance from the rack center to the center of strap 175. It also rotates tape wheel 160 and varies the position of the carrier at the end of its tape.

The rack is axially slidable within an eccentrically bored bearing 178 which fits within the sleeve 173 and which is cut out adjacent the pinion 171 so that the teeth of that pinion may properly be engaged by the teeth of the rack. A few degrees of adjustment of the eccentric bearing 178 provides for adjusting the said teeth for proper operation initially and to take up subsequent wear. The position of the bearing 178, when once determined, is temporarily locked by a locking screw 179 threaded into the sleeve 173 and engageable with a particular face of the shouldered end of the bearing thereby to clamp it in position.

In operation the rotation of the cam shaft reciprocates the rack to and fro since the eccentric 176 imparts to the rack the necessary movement for moving it through bearing 178 and as a result, the shaft 163 is also reciprocated to and fro throughout the desired angular extent. The meshing bevel gears 161 and 162 impart that motion through to the tape wheel and from that the tape itself is projected into and withdrawn from the shed.

The tape 180 at the left end of the machine is attached to the rim 181 of its tape wheel as illustrated in Fig. 26. The rim of the wheel is cut down or flattened at one particular point so that the tape itself may lie against that flattened point on the rim and its locking means will not project beyond the normal periphery of the wheel itself. The flattened portion of the wheel rim is also supplemented by an enlarged boss extending inwardly at that point as at 182 and this boss is drilled and counterbored for the reception of a pin 183 having a collar portion 184. The tape 180 is narrowed down adjacent its end and has an opening therein so that it may be fixed on the projecting part of the stud 183 thereby to position it circumferentially of the wheel. A spring 185 extends about the flattened part of the wheel and has a curved end 186 which causes the tape to conform to the curvature of the wheel after it has left the flattened part thereof. For holding and locking the elements in place, an angular locking clamp 187 having an opening therein to pass over the outer or short end of stud 183 is clamped in position by cap screws 188 or other equivalent locking means.

The tape is maintained in contact with the rim of the wheel 160 as illustrated in Fig. 3 and more especially at the detail view of Fig. 20, by a plurality of rollers or the like herein more specifically characterized as antifriction bearings 189. These particular antifriction bearings are of the type known as permanently lubricated and sealed ball bearings, but it is to be understood that others may be substituted therefor. Each of the guiding bearings 189 is retained within a pocket 190 formed as an integral part of a cover or guard member 191 which is maintained in position to guide and to protect the tape and tape wheel mechanism. It also serves the purpose of protecting those adjacent the loom from contact with the rapidly reciprocating elements or from possible injury in the event a tape should break. The cover 191 may be secured in place in any satisfactory manner, but is preferably attached at the forward end of the stud 158, Fig. 2, and it is to be understood that that stud is shouldered or is provided with suitable spacer elements so that when the cover is clamped into position, the tape wheel and its rotating gear 161 will be left with appropriate clearance for a proper running or working fit between the adjacent parts.

Each of the rollers or bearings 189 is mounted on an eccentric stud 192 which constitutes one end of a threaded bolt 193 having a collar 194 formed as an integral part thereof and being adjustably locked in position by a locking nut 195. There is a slight offset as illustrated between the stud 192 and the bolt 193 and the cone or internal race of the bearing is held in place on the stud by a quick detachable snap ring 196 or other retaining means. The adjustment of the parts is such that the tape has a few thousandths of an inch clearance between the rim of the tape wheel when the outer surface of the tape is pressed against the bearing. Proper adjustment is secured by applying a screw driver to the slot at the end of the threaded bolt 193 after loosening lock nut 195, and then tightening the nut to secure that particular adjustment permanently.

A suitable number of bearings 189 are spaced about the casing 191 and these may be increased or decreased within limits, although it is preferred that the tape be guided at fairly close points thereby to eliminate undulations or fluctuations in its pathway and to confine it to as nearly a true circular path in its flexing movement as is possible. Depending upon the width of material to be woven and the size of the wheel 160, the tape may be wound throughout different extents, but preferably, the wheel is maintained as small as is conveniently possible having in mind the fact that the oscillation of the wheel cannot exceed something less than a complete revolution and also the fact that the tape is preferably to be flexed throughout no smaller arc than is practicable. The overall width of the machine is kept as small as is reasonable having these various limiting factors in mind.

After leaving the top of the tape wheel, the tape is guided tangentially from the surface of the wheel by a horizontally disposed guide member 197 carried upon a supporting plate 198 attached by suitable bolts to the top machined pad surfaces 199 and 200 of the bracket 101. As shown in Fig. 3 and also in the detail view of Fig. 12, the horizontal guide is really formed as an elongated slide in which a groove running along the top central portion of the guide is provided with a fibre bearing surface 201 along which slides the tape 180 and over each edge of which are secured retaining strips 202 and 203. These strips and the bottom bearing member 201 may be formed of any phenolic resin or similar material, several of which are available and which form ideal bearing surfaces without the benefit of more than a minimum amount of lubrication The entire plate and guide mechanism is adjustable both vertically and angularly as well as transversely of the tape by means of vertically disposed adjusting screws 197' which pass down through the plate to bear against a steel or other hardened shim on the top surface of the underlying part of plate 198. Bolts 198' draw the guide downwardly to retain it solidly in position. For adjusting the guide laterally the screws 204 and 205 are loosened whereupon the whole structure including plate 198 and guide 197 may be moved since the bolts pass through enlarged holes or slots. The entire tape mechanism may be moved forwardly and toward the back of the machine by sliding the bracket 101 along its supporting guide member 102. The braces 103 and 104, as previously mentioned, are attached at the loomsides and a certain amount of adjustability there is available through slots so that for any particular setting of the tape mechanisms, these braces may be clamped or bolted in proper position to serve as strengthening structural members without causing any distortion of the bracket 101. Thus the entire tape wheel and its driving and supporting means may be adjusted as a unit by varying the position of bracket 101 along inclined slide 102, and the tape guide may be angularly varied, raised or lowered or set ahead or back to align the tape with its wheel and with the lay and the opposite tape.

Adjacent the inner end of the guide member 197 the tape is restrained so that it must conform to a particular pathway without imposing on it any appreciable additional friction. For that purpose, at each edge of the tape there is provided a contact roller 206 functioning against the top of the tape and pivoted on a horizontal axis and a similar roller 207 adapted to bear against the tape edge. Since these rollers and the mounting therefor are duplicated at each side of the tape, only those at one side have been illustrated in Fig. 12. The horizontally pivoted roller 206 is rotatable upon a bearing stud fixed in a boss 208 which forms an integral part of the inner end of the tape guide 197. While an adjustment may be provided for this roller, it has not been found necessary.

The other roller 207 which bears against the tape edge is more preferably adjustable since, by this means it is possible to cause the tapes and their attached carriers to align more accurately, thereby to facilitate entry of one within the other at the transfer at the center of the lay when the tapes have been extended inwardly to their fullest extent. The roller 207 is carried at the top end of a stud 209 and that stud is held within an eccentrically disposed aperture in a sleeve 210 having its lowermost portion formed as an enlarged cup-shaped member 211 within which a locking nut 212 is threaded to the lower end of the stud 209. By loosening the nut 212 and turning the sleeve 210 by engagement of a suitable tool with the cup-shaped part 211, the roller 207 may be brought toward or moved away from the center of the guide 197 thereby to direct the tape 180 either toward one side or the other of a normal, central pathway along the lay. It is to be understood that the guides 202 and 203 hold the tape downwardly and that there is a certain amount of clearance both vertically and along the edges of the tape, the primary directional constraint therefor being derived from these rollers. When proper adjustment has been secured, the eccentric member is held while the lock nut 212 is tightened.

Preferably the rollers 206 and 207 are the outer members of small antifriction bearings such as needle bearings, although it is to be understood that they may be formed as plain rollers mounted on lubricated bushings. In the interest of maintaining proper lubrication and preventing wear, and since the tape must be run as dry as is practicable in order to prevent soiling the threads which form the fabric, the self-contained and permanently lubricated bearings of the type described are preferred.

As illustrated in Figs. 22 and 23, the tape 180 at the left hand side of the machine has attached at its end a carrier 213, this particular tape having the larger carrier attached thereto, although it is quite possible to reverse the arrangement. At the opposite side of the machine as illustrated in Fig. 2, a similar tape wheel is driven in substantially the same manner and at that side the tape is guided in corresponding guiding elements and has attached thereto a smaller carrier numbered 214. For convenience this right hand tape is designated by numeral 215 and is precisely the same as the left hand tape, the only difference being in the carriers themselves and the manner of attaching the carriers to the ends of the tapes.

Carrier 213 is attached by a screw 216 or other means to a block, the said screw also serving to retain other parts of the carrier later to be described. The carrier and its block are then soldered or brazed directly to the tape end. A smooth joint is formed so that there will be no irregular surfaces to disturb the warp threads as the carrier passes through them. The carrier is narrower than the width of the tape itself since it must pass between the guide means for the tape as it moves to outermost position.

The opposite or smaller carrier is attached in a similar manner except for the fact that a pair of attaching screws numbered 217 pass vertically through the carrier and into a supporting block both of which are brazed to the end of the tape. These carriers will be described in greater detail in a later part of the specification wherein the heads and their function are to be discussed more fully.

It is to be understood that the tape wheels are operated synchronously so that each of the tapes and its head is projected into the shed and is withdrawn therefrom at substantially the same time. The heads meet at about the center for accomplishing transfer, although it is to be understood that a slight amount of deviation may be permitted, but in order to take advantage of the maximum amount of available time for inserting the filling while the lay is stationary, the ideal situation would be one in which transfer is effected at very close to the center point. The harness motion is adapted to open the shed in a conventional manner, but not to as great a width as is necessary in fly shuttle looms. That makes it possible to open and close the shed quickly without subjecting the warp threads to excessive tension.

As shown in Fig. 3, each of the eccentric sheaves such as the sheave 176 has a certain amount of angular adjustment about the cam shaft 105. This adjustment is provided by certain slots in a sector 218 which extends outwardly from a hub 219 set screwed or otherwise fixedly attached for rotation with the cam shaft. One or more screws 220 are threaded into the eccentric sheave and pass through the slots in the sector 218. When proper adjustment has been effected by adjusting screws 221, one at either side of the sector, and which extend inwardly to contact the adjacent screw 220, the screws 220 are tightened thereby clamping the parts in properly adjusted position.

At the extreme left hand end of the cam shaft a hand wheel 222 is provided for turning the parts slowly and manually as is frequently necessary in making adjustments or in running the loom through a cycle or more for the purpose of observing the actual functioning of the operative parts.

*Lay and lay motion*

Now referring to Figs. 5, 5a, 6 and 7, the lay motion will be described in detail. As previously mentioned, the lay parts and reed are mounted on lay swords 156 and rock about rock shaft 157. The actual construction of the lay swords is such that in cooperation with the supporting means therefor which forms a part of the rocking levers 223, the lay itself may be vertically adjusted, each end thereof being capable of independent movement.

The swords are machined to have flat surfaces somewhat vertically disposed, each of which forms the face of a pad 224 which is slidably mounted upon a corresponding pad 225 on its respective lever 223. A key and key slot designated by numeral 226 maintain the parts in proper vertical alignment and a pair of adjusting studs having nuts 227 and 228 pass through elongated slots in the pad 224 and are held within the cooperating pad 225 to maintain the parts in any desired adjusted position.

The actual vertical positioning of the swords and parts carried thereby is effected by lifting screws 229 threaded downwardly into the top portion of the pads 225 and having their heads bearing against a shoulder or ledge 230 cast as an integral part of the swords themselves. A locking nut 231 maintains the parts adjusted in properly elevated position in addition to the clamping studs and their nuts 227 and 228.

The levers 223 of which there are two, one at each lay sword and thus one adjacent each end of the machine, are forked having one fork portion 232 offset slightly toward the outer end of the loom so as to align with the cam 106 which is at the outer end of the cam shaft as compared to the cam 107. This forked and offset end 232 carries a follower in the form of a roller 233 for engagement with the cam 106.

The other end of the fork designated by numeral 234 has a pivot 235 on which is freely oscillatable a two-armed lever 236 to the outer end of which is pivoted a follower roller 237 similar to the roller 233. This lever 236 aligns with the main portion of the arm 223 and thus the roller 237 is in alignment with and contacts cam 107 all as illustrated in the sectional view in Fig. 6 taken at line 6—6 of Fig. 5. The arm 236 is pivoted at point 235, but is always urged by a spring 238 or other resilient means, so that the roller 237 is pressed toward its cam or, to state it in another way, the two followers 233 and 237 are always pressed together with a definite amount of resilient force so that they always contact their cams one of which is a positive cam for moving the lay and the reed to beat up position while the other is merely a return cam functioning through the resilient spring 238.

Spring 238 is compressed between the end of the lever 236 and a pad on a rib 239 on the arm 223, axial positioning of the parts being assured by a T-headed bolt 240 passing through the end of the arm 236 and through a boss on the rib 239 to be locked in position by nuts 241. The followers 233 and 237 are preferably of fibrous material such as one of the well known phenolic resins or other similar compounds adapted to be molded under extreme pressure and each of these rollers is mounted on its pivot or spindle upon needle bearings or other antifriction means. The adjustment of the bolt 240 and of the spring 238 is such that there will never be any appreciable play between the followers and their cams and the construction provides further for easier setting of the parts initially or for adjustment after an extended period during which there will have been a certain amount of wear.

A bushing 240' surrounding the bolt and enclosed by the spring serves to limit movement of the lever 236 relatively to arm 223 in case the spring should fail. In that event the rollers 233 and 237 may move away from their cams about $\frac{1}{16}$" to $\frac{1}{8}$" according to the clearance provided at the end of bushing 240', but that can lead to no particular difficulty except for noisy operation until the loom is stopped and the spring replaced. Otherwise the timing of the lay relative to the tape movement might be so adversely affected that a serious smash would result.

Now referring more specifically to Fig. 7, the cams 106 and 107 are preferably formed integrally by casting, but may be fabricated in any other manner and need not be integral since each may be separately and rigidly fixed to a single hub or to the shaft itself. The preferred construction is, however, that which is illustrated here. A hub 242 is provided with bosses through which set screws are threaded for the purpose of tightening the cam on the cam shaft when their position has once been established. Since the other parts working from the cam shaft are all separately adjustable, it is not necessary to change the position of these once their correct position has been established. The cams are divided into two portions, one of which is an active portion providing for the movement of the lay while the other opposite part thereof is concentrically disposed about the shaft and provides for dwell of the lay while the filling is being inserted. It has been found that a dwell of from 180° to 210° serves quite satisfactorily, although it is to be understood that deviations from those figures are possible and for certain purposes or under certain circumstances, the dwell may vary slightly above or below those figures.

Since the followers 233 and 237 are angularly disposed with respect to radial lines through their centers and through the pivot 157, a corresponding offset has to be provided between the points of the cams themselves. As here shown, that offset amounts to 15½°, although for other angular separation of the follower rolls and variations in other factors, corresponding changes must necessarily be effected. The point of the active or beat up cam 106 is actually positioned 119½° ahead of the next following active portion of the return cam. That figure has been adopted for a cam having a 200° dwell, and of course, is subject to change as circumstances require.

Now referring to Fig. 5a, certain details of the lay will be described. The lay 83 is grooved as shown for reception of the lower bar for the reed and is also grooved for a glass or other hard surfaced rod 243 over which passes the lower stretch of warp threads, this glass rod 243 being effective for elevating the said warp threads so that they would not normally contact a wooden or other strip 244 fixed at the upper forward end of the lay beam itself. This strip 244 is primarily for the purpose of guiding the warp sheet through a felt pad 245 at the rearmost part of the strip and for supporting the tape and carriers.

One of the tapes 180 and its carrier 213 are shown in the relative angular relationship which they bear to the top surface of the strip 244. It is preferable that the tape itself be inclined upwardly and forwardly more than the strip so that the rear edge only bears against the warp threads and felt pad 245. Thus the front edge of the tape and of the carrier itself is relatively free of the warp threads and, of course, is well above the strip 244 thereby obviating any possibility of interference with or retarding of the free or cut end of filling which drags beneath the tape at that edge.

The lay is relatively light as compared to the corresponding parts of a conventional loom and thus the reciprocatory motion thereof, although the acceleration forces are fairly large, is not accompanied by any great inertia forces and thus all parts are subjected to little stress. It has resulted in lightening the swords and other rocking elements. Of course, the lay beam and parts carried thereby need be only long enough to accommodate the reed for the widest fabric intended to be woven on any particular loom and to guide the tapes as they enter the shed.

*Filling motion*

Now referring to Figs. 8, 9, 10, 11 and 13, the filling motion will be described in greater detail. It is to be understood that the filling motion is duplicated at each side of the machine, one being the reverse of the other insofar as is essential for it to feed to the tape moving inwardly from its particular side as compared to the arrangement of parts necessary for the corresponding tape projecting filling into the shed from the opposite side. Each filling motion is rotated by mechanism previously described and there is a four to one reduction in the drive from the main cam shaft to the cam shafts of these filling motions which make one revolution for every four picks. In fact, a complete filling motion cycle may be considered to include the insertion of a so-called "hairpin" from the right and a similar movement of the parts incidental to inserting a complete "hairpin" from the left, or vice versa. That cycle includes four picks inserted in four separate sheds after which the cycle is ready to repeat. Certain other schemes may be employed, but basically the cycle includes the steps as above briefly described, the timing merely being possible of variation so that picks from one particular side may, instead of following immediately, be spaced as will be explained hereinafter.

The cam shaft numbered 139 and which is rotatable in bearings at the ends of the casing 136 has adjustably fixed thereto a plurality of cams. The two intermediate cams along the shaft are illustrated in detail in Figs. 16 and 17 and function together and are also adjustable as a unit in addition to being separately adjustable with respect to one another. The other cams are somewhat similar in that they are each comprised of two cam plates fixed together and adjustable angularly with respect to one another so as to vary their active surfaces, although the actual contours of the separate cams are quite different.

The cams, as will be seen from an inspection of Figs. 14–19 are active throughout only one-half revolution of their particular cam shaft and are concentric for at least 180° of their periphery, it being understood that each filling motion is offset 180° with respect to the other, at least for producing fabric herein described as a preferred example.

The first cam at the outer end of the cam shaft 139 and which comprises the two plates shown in greater detail in Figs. 14 and 15 is generally indicated by numeral 246. That cam serves to control the opening and closing of a filling thread binder generally designated by numeral 247 and shown in greater detail in Fig. 13. The cam 246, shown in greater detail in Figs. 14 and 15, is comprised of the two plates 248 and 249 which are butted together with their hubs extending in opposed directions. Plate 248 has a hub 252 by means of which it may be fixedly positioned along the shaft 139 or adjusted about that shaft. The angular adjustment about the shaft which is effective to vary the position of the entire assembled cam unit will be described with respect to the cams shown in Figs. 16 and 17, and that description will suffice for all the cams since their adjustment is similar. The opposite plate 249 has a similar hub.

By closing the gap between the inclined cam faces 253 and 254, the time during which the binder 247 is closed to prevent withdrawal of thread from the supply may be varied. By angular adjustment of the appropriate plate, the time of opening or closing the binder may be set ahead or retarded. The cam 246 functions upon a follower 255, Fig. 8, rotatably mounted in the forked end of a tappet 256 which passes through a bearing or guide in the rearmost part 257 of the casing 136. This tappet is prevented from rotating by means of a key 258 which engages in a corresponding keyway or slot cut in the guide so that the follower 255 is always maintained in proper relationship within the same or a parallel plane to the plane of the cam itself.

The binder 247, hereinafter termed the outer binder, is supported at the end of an arm or bracket 259 attached by suitable bolts or screws to the side of the casing 136 and at a point adjacent the rearmost portion thereof. This arm 259 has a guide lug 260 extending angularly therefrom for the purpose of supporting an extension 261 from the tappet which extension carries a number of collars which will be described in more detail presently, but which, at its outer end, fixedly supports a short guide arm 262 having at its relatively free end a boss 263 within which is adapted to slide the end of a rod or spindle 264 on which is mounted an eyelet 265.

The arm 259 has a second lug projecting in the opposite direction from the projection 260 and that lug carries a pivot pin 266 on which is pivotally mounted a two-armed lever one arm 267 of which is engeged by an adjustably fixed collar 268 on extension 261 and by a washer 269 forced toward collar 268 by a spring 270 adjustably compressed under the influence of a second collar 271. The other arm 272 of this lever pivoted at 266 is forked and engages the movable element of the outer clamp 247 in a manner and for the purpose hereinafter to be described in greater detail.

The extension 261 and, of course, tappet 256 and follower 255 are retained inwardly toward the cam 246 by a spring 273 forced under considerable compression against the extending lug 260 and a collar 274. It is to be understood that the spring 273 is under sufficient stress to return the tappet and follower after they have been pushed radially away from cam shaft 139, even though the general tendency of the binder itself is to maintain the parts in the opposite direction. In other words, the cam 246 is effective for permitting the binder spring to open binder 247 and the springs 273 and 270 must be sufficiently strong for closing the binder when that is permitted by the depression in the cam, that is, that portion included between the inclined surfaces 253 and 254, Fig. 14. Spring 273 is stronger than spring 270 and the latter compresses slightly as the binder reaches its thread clamping position.

Now referring to Fig. 13, the details of the outer binder will be described. The end of the arm 259 has been cast to form a shouldered, circular sleeve 275 and a hub 276 within which is received a reduced end 277 of a conical binder element or plug 278. This plug is maintained concentrically with respect to the sleeve 275 and is held in position by a nut 278, or in any other satisfactory manner. A holder indicated by numeral 279 has set therein a porcelain or other eyelet 280 through which the thread is guided as it is drawn from the supply. The eyelet 280 is set at an angle so that the thread is drawn parallelly by the surface of the conical plug 278. Cooperating with this plug 278 is a concentric collar 281 having a flange 282 at its outer end. The collar fits into the interior bored portion of the sleeve 275 and is centrally apertured to present a conical surface of about the same angle as and concentric to the plug 278. A spring 283 between a shoulder on the main binder and the flange 282 and outside the sleeve 275 normally tends to maintain the collar separated from the plug so that the thread my pass freely from the cone or other supply as it is drawn therefrom when inserted into the shed. The forked end 272 of the two-armed lever pivoted at 266 will, when the cam arrives at the proper position to permit the spring 273 to push the tappet toward the cam, close the binder against the tension of spring 283. The actual force applied at closing is roughly the difference in tension between the springs 270 and 283. The tension in spring 270 exceeds that of spring 283 and this difference is considerably less than the force applied by the compressed spring 273. The parts remain closed until the cams rotate to a point where the tappet is again pushed outwardly at which time the collar 268 positively withdraws the forked end 272 of the lever to a position where spring 283 separates the thread-engaging, clamping parts.

Now continuing with the description of the filling motion, the two cams centrally disposed along the shaft 139 function to impart movement to a thread-engaging depressor hook indicated by numeral 284. This hook is for the purpose of engaging the filling thread to position it prior to its being taken by the tape head preparatory to inserting a pick at the shed. This hook actually pulls the thread downwardly for the first pick, between the eyelet 265 and the other or, as hereinafter termed, inner binder and cutter, and for the second pick between that eyelet and a trap hereinafter to be described in greater detail. The hook is of a shape illustrated in Figs. 9, 28 and 29 and must have a compound movement imparted thereto. It always follows the same general pathway. The hook at its opposite or operating end is provided with two pivot points 285 and 286, at the topmost one of which is pivotally attached a forked end of a lever arm 287 pivoted at 288 to a supporting bracket 289. The other end of the lever comprises an upwardly extending arm 290 which is engaged by an end of a second tappet indicated by numeral 291 and passing through a similar guideway in the adjacent part of the frame 136 to have a follower 292 carried at its inner forked end engageable with the first cam 293 of the said pair of cams centrally located along the shaft 139.

The arm 290 extends upwardly to a hooked end 294 to which is connected a spring 295 under tension and secured at its opposite end to a connector piece 296 attached to the topmost surface of the rear portion 257 of the casing.

A similar lever having a depending arm 297 is also pivoted at 288 and extends upwardly to connect to a similar spring 298, Figs. 8 and 9, by which its follower 299 carried by a tappet similar to the tappet 291 is maintained in contact with the second cam of the pair designated by numeral 300. The lower forked end of lever arm 297 has connected thereto at a pivot point 301 a link 302 the other end of which is forked and attaches to the pivot 285, that being one of the pivots previously mentioned at the operating end of depressor hook 284.

Now continuing with the description of the filling motion, the remaining elements which comprise the inner binder and cutter and the trap are shown in Figs. 8 and 9 and also in greater detail in Figs. 10 and 11. These parts are mounted on a second arm 303 which is bolted or otherwise attached to the inner side of the frame 136 as was the arm 259, previously described. This arm 303 has cast or otherwise formed as a part thereof, the extending lugs 304 and 305 through bearing holes in which is slidable the rod 306. The bracket 303 also has a third projecting lug or supporting member 307 which extends downwardly toward the outer end of the filling motion assembly, that is, toward the top in Fig. 8.

The rod 306 is actuated by a tappet 308 which is guided in a manner similar to the other tappets and which has at its end adjacent the cam shaft, a follower 309 which is engaged by certain cam lobes on the cam generally indicated by numeral 310. This cam 310 is actually comprised as a double cam disc each of which is adjustable relatively to the other and the details of which are illustrated more clearly in Figs. 18 and 19 to be referred to more particularly hereinafter.

A spring 311 under compression between the projection 304 and an adjustable collar 312 normally tends to keep the rod 306, the tappet and the follower 309 pressed forwardly or so that the follower always bears against the surface of the cam 310. This cam has a contour such that it opens the binder and cutter to release the previously cut filling thread during the first pick of the cycle, and then at a later point in the cycle, closes the trap for the filling thread after which, at the second pick, it opens the trap to release that thread and closes the binder and the cutter to sever and to hold the filling until it is again demanded. Thus at each side of the machine, these cams 310 function once as above described for every complete cycle or for every four picks of the machine.

The fixed part of the cutter is attached by a screw 313 beneath the bracket 303 and comprises two plates numbered 314 and 315. The plate 314 is bent as illustrated in the bottom view, Fig. 11, and a movable cutter blade 316 functions between these plates 314 and 315 to sever a thread as it is moved upwardly into the space designated by numeral 317, Fig. 10, and the rod 306 is permitted by the cam to be drawn to the left, Figs. 10 and 11, under the influence of the spring 311.

The binder comprises two flat surfaces of relatively movable parts one of which is carried by the rod 306 and which is designated by numeral 318. That binder element is formed as a part of a casting or otherwise fabricated piece which depends from a hub or barrel portion 319 held on a reduced end 320 of the rod 306 and retained in place by nut 321. The other part of the binder comprises a flat plate 322 formed at the end of a stem 323 which extends into a hole in the downwardly projecting extension 307 and is urged in the direction of the relatively movable binder 318 by a spring 324 bearing against a shoulder on the stem 323 and the inner wall of the hole, the reduced end 325 of the stem being threaded and having adjusting nuts 326 for the purpose of maintaining this binder part in a properly adjusted position relatively to the other binder part 318.

The plate 322 is faced with a reasonably hard, resilient material and this facing, indicated at 327 is contacted by the parallel face of the movable clamp member 318 when a thread projected between them is desired to be held. Since the spring 311, Fig. 8, is considerably heavier than the spring 324, the latter is compressed so that the entire clamp structure mounted on stem 323 is moved slightly to permit complete motion for the rod 306 and all the parts attached thereto.

While reference has been made to relatively movable and fixed clamping elements, it is to be noted that the clamping elements carried on stem 323 are slightly movable as permitted by spring 324. However, that motion is incidental to the clamping function and adjustment of the nuts 326 varies the time at which clamping occurs relatively to the cutting function. The intentionally movable part of the clamp is, of course, the part that moves with the cutter blade 316 and the rod 306.

The movable binder element has a vertical, lateral face which is properly aligned with the plates 314 and 315 so that the movable cutter blade 316 may be attached to the side of the binder casting by screws as shown, or in any other desired manner. The movable blade 316 has a projecting part indicated by numeral 328, this projection always being entered between the cutter plates 314 and 315 which are pressed together and thus would not otherwise permit reentry of the cutter blade after its withdrawal.

The rod 306 as moved by cam 310 also functions to position the eyelet 265, that function being accomplished through an intermediate lever 329 pivoted at 330 on the projecting support 307. Pivot 330 is of eccentric type so that adjustment thereof varies the effective center and thus the relative length of the arms of lever 329 to change the stroke of eyelet 265. The lever 329 has a forked end 331 which engages an upwardly extending pin 332 which is threaded into one of the elements movable with the rod 306, or to the rod itself. The other end of lever 329 is attached at 333 to the adjustable connecting piece 334 at the threaded end of the rod or spindle 264 to which the eyelet 265 is adjustably fixed. Thus as the binder and cutter and the trap presently to be described are moved throughout their cycle during the insertion of two picks of filling, the eyelet 265 will first be moved to one extreme position and then to the other, the purposes of such change of position for the eyelet being more particularly pointed out in a later paragraph incidental to description of the complete operation.

The binder element 318 has formed as an integral part thereof a trap member 335 which is pointed and tapered at the edge 336 so that filling thread held thereon, upon release, will slip from the point at an appropriate time after the filling carrier has reached a safe point in its movement across the shed such that the filling will have come definitely under the control of the filling carrier and may not become entangled upon its release. This trap member 335 forms a V-shaped opening 337 within which the filling thread is deposited at certain times during the cycle as the rod 306 moves rearwardly or radially away from the filling motion cam shaft 139.

A blunt ended, conical contact piece 338 at the end of a stem 339 serves to complete the trap so that the filling thread may not escape therefrom after rod 306 has virtually reached its extreme position during the trapping movement. The spring 340 maintains the contact piece 338 in proper position to be engaged by the point 335 of the trap and also allows the element 338 to be pressed rearwardly slightly as is necessary if the cam movement projects the trap point farther than is really necessary to make contact with the element 338. A piece of facing material is attached at the end of the contact piece 338, this material being indicated by numeral 341 and being of such a nature as to indent slightly under the pressure exerted by the point 335 but which will not deform enough to retard ready release of the thread thereby to prevent accidental displacement of the filling held between the elements. The adjustment of the stem 339 also determines the point at which the trapped thread will be released.

The stem 339 is slidably retained within a boss 342 at the end of a curved arm 343 which is attached to the end of the arm 303. Lock nuts 344 provide an adjustment so that upon outward movement of the trapping member with the movable binder 318, the point thereof will contact the member 341 and will compress spring 340.

Now referring to the cams as shown in Figs. 14–19, the adjustment therefor will be described. Since the general scheme of adjustment is the same, the specific details with respect to the cams of Figs. 16 and 17 will suffice for a description of all. The cam 300 which is provided with a hub 345 is capable of being adjusted throughout a fairly great angular extent by means of the adjusting screws 346 and 347 which are threaded through the hub as illustrated in Fig. 16, one at one side of the center line and the other at the other side so that their points engage a ledge or shoulder milled from the cam shaft 139, these shoulders extend along the horizontal center line as the parts are shown, but the actual amount of cut-out may vary more or less. Release of one screw and tightening of the other moves the cam angularly about the shaft.

The cams 248 and 249, Fig. 14, are each provided with hubs as illustrated, and similar adjustments permit each of the discs to be rotated throughout a limited angular extent, but sufficiently for any adjustment likely to be necessary. Of course, it is to be understood that if an entirely different cycle incidental to weaving various other types of fabrics is to be effected, then a substitution of different cams is in order and those cams will provide for the different cycle, but may likewise be adjustable as herein shown to effect the slight adjustment of parts necessary to proper operation of the filling motion.

In the case of the cam illustrated at Fig. 18 which is cam 310 of Fig. 8, the discs 348 and 349 are each provided with hubs similar to the hub 345 and with a similar adjustment.

Since cams 293 and 300 should bear a particular relation to each other and it is not only desired to advance or retard both simultaneously, but also to effect angular adjustments between the two, the cam 293 is adjustably connected by the hub 345 of cam 300. Screws 350 and 351 pass through slots in cam 293 and are threaded into hub 345. The slots are of sufficient extent to provide the necessary range of movement of one cam relatively to the other.

The cam 246, Figs. 14 and 15, as above mentioned, permits the first or outer binder 247 to be closed as the cam follower moves down the incline 254, retains it closed for a given angular extent as the follower rides on the lower concentric surface 352, and then upon contact with the inclined part 253 of the cam, opens the binder 247 and that open condition then prevails throughout the remainder of the cycle. In each of the cams illustrated, the zero degree position is shown at the right hand end of the horizontal center line and the general angular arrangement of the cam contours is such as to cause the filling motion to function properly during weaving as illustrated in the complete cycle of Figs. 30–55. For the opposite group of cams the 0° point would lag 180°.

Now referring to Fig. 16, the cam lobes 354 and 355 control the levers 297 and 287, respectively, for the purpose of imparting a proper motion to the depressor hook 284 at the first pick of the cycle, that is, considering the cycle at one particular side of the machine. The first pick at the opposite side will be controlled by corresponding cam lobes on the opposite filling motion, but which are 180° spaced from these. Then the corresponding lobes 356 and 357 function to impart a similar movement to the depressor hook during the second or following pick of the particular pair of picks which comprise the "hairpin" which is inserted at that particular half cycle.

Now referring to Fig. 18, the two adjustable cam plates which comprise cam 310 present a contour at 357' which is effective to push the rod 306 rearwardly or radially away from the cam shaft 139 to open the inner binder and cutter and to close the trap on the first pick. The concentric surface 358 maintains the trap closed and the binder and cutter open until the filling releasing point is reached whereupon the rapidly declining surface 359 permits return of the rod 306 thereby to close the inner binder and cutter and to open the trap on the second pick.

*Filling carriers and method of transfer*

Now referring to Figs. 22, 23 and 24, the larger filling carrier 213 will be described in greater detail. The carrier itself is formed from sheet material, although it may be fabricated in any other manner, and is of general U-shape as shown in the cross section, Fig. 24. The sides are brought forwardly to form V-shaped points 360 and 361, the central part or the point of the V being at about one-half the total height of the head so as to follow along more or less centrally of the shed and to part any warp threads which may be improperly placed interiorly of the extreme planes which should be occupied by the shed. The filling retaining mechanisms or grippers positioned more or less centrally of the head or carrier are located between the side members and behind to the points 360 and 361 as they move into the shed and thus are in effect guard means which make it impossible for any of the warp threads to become engaged within these carriers as might otherwise be the case. Of course, if a warp thread were to be caught in one of the carriers considerable damage might then be done.

The top portion indicated by numeral 362 is formed with a notch the extreme end of which is at about the point indicated by numeral 363 and this notch, generally centrally located, is adapted to guide and to control the filling thread which is temporarily held in position to be engaged within this notch as the carrier is projected into the shed by its tape 180.

It is to be understood that each carrier functions as an inserter for pushing filling toward the center of the shed and then on a subsequent part of the cycle, functions to engage filling transferred from the opposite carrier, and to draw it outwardly from the shed thereby extending it completely across the width of the fabric. A gripper which includes a hook 364 and a guide 365 is centrally positioned with respect to the horizontal width of the carrier and this hook and guide all form a part of a gripper member one of which is necessary for each of the tape heads. This gripper is retained at its outermost end by being inserted into the block or other support at that part of the carrier and clamped in place by the screw 216.

The hook itself has an extension in the form of a curved barb of wire 366 which actually forms a trap between the parts 364 and 365. The guide 365 is splayed or grooved adjacent the wire trap 366 and just space enough is left between the interior of the groove and the wire trap to permit entry of the filling thread. Once the thread has entered the notch 363 and at the same time has become engaged within the gripper, it cannot be withdrawn then except by being pulled endwise from the gripper. That is possible only when one end of the filling has been freed and the opposite gripper has received the filling during transfer whereupon it functions to pull it endwise through the opposite gripper.

The right hand or smaller tape head or filling carrier has a notch 367 and the thread at this side is fed slightly off the vertical center of the tape so that it enters this notch by which it is moved over to the central position at the innermost end of the notch as the tape is projected into the shed. The gripper at this side is really formed as a part of the top of the tape head itself. It is also evident here that the tape head is formed of rectangular or box section and, although it may be fabricated in many different ways, is provided with the pointed guard members 368 and 369 which perform the same function and contribute to the safety and certainty of operation as do the guard members 360 and 361.

The top plate of this carrier is actually cut out to form the notch 367 and also a hook 370 and a guide 371 similar to the elements 364 and 365 at the left hand side. A wire barb 372 functions in similar manner to barb 366 and the filling once having entered the gripper may not be withdrawn except after release of one end, all in the manner above described with respect to the left hand side.

The gripper including the hook, guide and trap at the left hand side is formed at the end of a bar of flat material indicated by numeral 373 and is at a somewhat lower elevation than the corresponding parts to be found at the smaller or right hand carrier member. That permits the registering or overlapping of the gripper members and the filling thread held in the carrier notches as transfer is effected. When a filling thread is projected toward the center of the shed by the left hand gripper and since it is held in reasonably taut condition between the notch 363 and the corresponding notch in the gripper, the right hand gripper when that tape head is projected into the left hand, actually engages with the thread thus held so that it slips between the barb 372 and the guide 371 and becomes caught within the space between those parts and the hook 370. That all takes place just as the tapes and carriers reach the extremity of their travel and overlap or become interengaged at the center of the shed. Then upon return movement, since one end of the thread which has just been inserted by the left hand carrier has been released or freed, the right hand gripper will draw that filling thread out of the left hand gripper to extend it the remainder of the distance across the shed, the actual length provided by cutting at the proper point permitting that amount of extension of the filling with a slight excess to extend beyond the selvage.

In operating from the opposite or right hand side of the loom, the filling is engaged within the notch 367 and is projected to the center of the shed whereupon the overlapping or interengagement of the carriers causes that filling which runs down through the notch 367 and along the bottom of the carrier after emerging from the wide notch indicated by dotted lines in Fig. 22, and is in taut condition, to be engaged and trapped within the left hand gripper. The filling will have been cut or released just previously to the transfer as above described and return movement of the parts permits the left hand gripper to extend the length of filling outwardly for the remainder of the distance across the shed and for a slight distance beyond the selvage.

In some instances a slight amount of plush, fur or other friction material may be provided within the interior of the grippers so that the filling may not be withdrawn too rapidly, may not slip through upon the inserting stroke, nor will it become too loose for proper engagement by the opposite gripper to effect transfer. It is indicated by numeral 374 in Fig. 24a which is enlarged to show the details of the gripper including the hook, guide which is grooved and the wire barb which fits within the groove, but leaves sufficient space for the thread to pass into the gripper, but will not permit its withdrawal except as above explained.

*Operation*

Now referring to Figs. 30–55, the operation of the loom to produce a preferred type of fabric will be described, these figures showing diagrammatically the steps incidental to inserting four picks, that is, two complete "hairpins" or one complete cycle after which the mechanism merely repeats.

Starting at Fig. 30 and first considering the introduction of two picks or a single "hairpin" from the right hand side, the filling F may be assumed to have been cut and to be held as illustrated in the inner binder 318 after having been drawn from the supply S, through the outer binder 247, eyelet 265 and into the path of the depressor hook 284. These binders, cutters and the trap 335 are indicated by one of the numerals applied to the dominant parts thereof in figures previously described in detail.

At the start, as shown in this Fig. 30, the outer binder is open permitting free passage of the filling, the eyelet 265 is held substantially in alignment therewith and over the carrier path, and, of course, the inner binder is closed while the trap is open.

In Fig. 31 the parts occupy practically the same relative positions except for the fact that the depressor hook has been moved downwardly to draw a little of the filling from the supply and to present a somewhat vertically disposed, although slanting, stretch of filling directly in the pathway of the entrance to the notch 367 in the right hand filling carrier 214. That carrier has started its movement toward the shed and has just taken the filling into the notch as shown in that figure and in Fig. 28.

In Fig. 32 the depressor hook has disengaged the thread so that a somewhat loose end indicated by numeral 375 extends from the inner binder to the carrier 214, it being understood that this loose end extends down under or beneath the carrier and tape as previously described. That results from the particular manner in which the filling is actually presented to the carrier as shown more definitely in Fig. 28. The essential point to be observed is that the eyelet 265 is held in such position above the advancing carrier that the vertical stretch of filling passing downwardly from the eyelet to the depressor is in the pathway of the notch in the carrier. This is the first pick of a "hairpin" and the end to be released is the end in the binder so that feeding in this manner always assures that the said end will be dragged along beneath the tape as it moves across the lay. That provides more control and assures that the filling will actually be drawn from the supply since less resistance is offered to its withdrawal therefrom than from the opposite or lower side of the carrier and tape. Otherwise the release of the filling by the inner binder might merely result in its being unthreaded or, at least, displaced, as the tape and carrier move across the lay. If so, action would be so uncertain that it would not be possible to measure off precisely the amount of filling to reach across the fabric and for a very short distance beyond that.

In Fig. 33 the loose end 375 is actually released from the inner binder, and at the same time, the eyelet which is controlled simultaneously therewith starts to move over to one side of the general line of movement of the tape. At this time, sufficient material to reach across the fabric being measured, the binder 247 adjacent the supply is closed. Of course, the cam for controlling this outer binder must be set accordingly. The filling stretching from the eyelet to the carrier as shown in Fig. 32 aligns with or is in a line to pass upwardly into the trap 335. The point of the trap is at such an elevation that it, when it is moved toward the trapping position as the cooperating binder is released, makes certain that the filling is engaged thereby. In Fig. 33 the point of the trap has actually passed under the filling and corresponding movement of the eyelet assures that it cannot escape even though the trap has not completely closed at that particular point.

In Fig. 34 the tapes and carriers have arrived at the mid-point along the lay or within the shed and transfer then takes place. The outer binder is still closed and the trap has moved still farther toward its closed position while the inner binder and cutter are practically open. It is to be noted that the loose end 375 has been drawn into the shed and it is that end that will be affected by the left hand carrier to be extended over to the opposite selvage of the fabric.

In Fig. 35 the carriers have started to recede from the center, the binder 247 still being closed as it must be until the filling has been stretched entirely across the fabric and released by the gripper in the left hand carrier.

That action has been completed as shown in Fig. 36 and the outer binder has been opened. The steps thus far described have been incidental to laying the first pick of the "hairpin" to be inserted from the right hand side. The steps of the following Figures 37–42 will now be described to show how the second pick is inserted.

In Fig. 36 the depressor hook has again engaged the filling and has drawn it downwardly, but as shown in the following Fig. 37 and also in the perspective view of Fig. 29, that filling is now drawn down from the trap rather than from the inner binder and it is offset by the eyelet 265 so that the incoming carrier cannot contact the filling between the eyelet and the depressor hook as in Fig. 28, but must move slightly farther inwardly toward the trap to engage the stretch of filling running from that instrumentality to the depressor hook. Thus, the pick to be inserted will be comprised of filling thread which loops around from the selvage of the fabric, it being understood that the shed will have changed after beating up, and the filling for this pick must be drawn first from the supply.

As shown in Fig. 38, the carrier has entered the shed of the fabric and after drawing the filling over or through the trap from whence it extends to the selvage and the pick previously laid, is actually pulling material from the supply, that end lying beneath the carrier and also beneath the tape. In Fig. 38 the trap is about to start to open and the depressor hook, of course, has disengaged the filling.

Now continuing on to Fig. 39, the trap has opened sufficiently for the filling to slip therefrom and thus there is a loose loop (not a loose end) indicated by numeral 376 and which is quickly tightened to form a selvage loop 377, Fig. 40, at the edge of the fabric.

Just before that, however, the inner binder and the cutter will have operated to cut the end coming from the supply and to bind it. As shown in Fig. 40, a loose end 378 is now being dragged into the shed, but still is beneath the tape just as was the loose end for the first pick. This cutting and binding action takes place at a point timed so that just enough filling will be available for stretching across the fabric to reach the opposite selvage. Actually, the timing of the cutter and its accompanying binder is such that the cutting precedes the binding by a very brief interval. Theoretically, both should happen at the same instant, but that is very difficult of attainment, and to operate on the safe side, the cutting is set to occur just before the binder has reached its fully closed position. Of course, the trap is then open and the eyelet 265 has moved back into substantial alignment with the outer binder in readiness for repeating the cycle slightly more than two picks or a little bit over one-half a complete cycle away.

Continuing on, the transfer has just been completed at Fig. 41, the filling motion parts remaining in their same position, and in Fig. 42 the tapes and their carriers have been moved to such positions that the complete "hairpin" comprising both picks has been inserted, it being understood that the harnesses have functioned in a normal manner to change the shed after each pick so that the next will be laid in a shed reversed from that of the previous.

The lay will have also made two movements to beat the filling into the shed, that being accomplished by mechanism above described and in between the actual laying of the filling for each pick, it being understood that the lay is stationary at that time.

Now continuing on with Figs. 43–55, the steps are repeated at the left hand side of the loom and while that goes on, the filling motion at the right hand side is functioning at the concentric, 180° or greater part of the cam contours. Thus, at that side, the parts remain as illustrated in Fig. 42 until the cycle is again to be repeated.

What is actually accomplished at the left hand side is precisely the same as was described with respect to the right side of the machine. In Figs. 43 and 44, the filling has been caused to assume the position shown in Fig. 28, or that position preparatory to the first pick of a "hairpin." The only difference in what takes place is that the left hand carrier 213 is of slightly different form as previously described and the actual transfer will be effected from the left to the right or smaller carrier, the details of which have been described. It is to be understood that Figs. 28 and 29 would actually be reversed left to right for a showing of similar parts at the left hand side of the machine and also that, since the filling is fed to the center of carrier 213 instead of closer to the edge as with the smaller carrier, the actual setting of the parts is slightly different. However, the same general principles apply. It is believed that with the description of what has taken place at the right hand side, the Figures 43–55 will be clear and that one may merely follow through the steps of inserting the two connected picks which then form a selvage 379, Fig. 55, at the left hand side of the fabric while two short ends protrude at the other side.

The filling supplies, as above indicated never run out so long as at least one filling thread package is kept available in the holders. One of the holders is shown in greater detail in Fig. 27 and a thread package 151 in the form of a self-sustaining package, conically wound, is shown in place. This particular holder, as is clear, would provide for two packages and the guard plates 380 and 381 keep the thread running from either of the packages separated from the other, but permit the trailing or last end to be drawn from a package to be tied to the initial end of thread from the other.

For convenience the packages are placed in operative positions by pushing the core downwardly onto the spindle 382 which is mounted on a pivoting arm 383 hinged to a bracket 384, and tipping it inwardly. That is only one scheme which may be used, but it serves to facilitate the replacement of an expended package and while the thread is actually drawn from the packages as here illustrated when they are in a horizontally disposed position, it is to be understood that they may be mounted in other attitudes, for example, in a vertical position so that the thread is drawn over the tip of the cone and vertically upward to guiding eyelets or other guide elements commonly employed in the control of a thread under similar circumstances. At the front of the holder an eyelet 385 provides for guiding the filling thread outwardly from the holder and directly into the outer binding 247.

In some cases, or with some materials, it may be found advantageous to employ a drawback or take up type tension such as would compensate any tendency toward slackness in the filling as it passes between the supply and the binder 247. Such a drawback tension or take up means might also be accompanied by other tensioning devices to control or prevent overrunning of the thread as it approaches the filling motion.

Figure 56:
Fig. 56 is a view showing diagrammatically the fabric as produced according to the preferred method, the steps of which have been described with respect to Figs. 30 through 55.

Now referring to the diagrammatic Figures 56–59 different fabrics possible of being made on the loom herein described will be described. Fig. 56 shows the fabric produced when operating the loom as herein described, or according to what is generally considered a preferred method of operation. That fabric has a selvage at each side produced during the weaving operation. The extending ends of the "hairpins" are to be understood as being shown proportionately longer in these illustrations than is the case in the actual fabric when the machine is functioning in an intended manner, the extent of the filling beyond the selvage then being uniform and in the order of about ¼" to ½".

It is generally intended that the method and mechanism comprise two complete filling motions, one at each side of the machine, and, of course, the accompanying tapes, tape drives and filling carriers at each side. It is, however, quite possible to operate at one side only and, although a machine might be somewhat simplified by eliminating the filling motion at one side, that has a definite disadvantage in that there is then no selvage at one side. The selvage that is woven at the first side will be a perfect one having no protruding ends, but the opposite side will have no selvage structure whatsoever unless supplementary mechanisms such as are known in the prior art be availed of for producing some sort of twisted selvage, knitted selvage or tucked ends such as have been frequently suggested, but which require considerable mechanism and may not be as satisfactory when compared to selvages such as are produced in the fundamental operations incidental to the insertion of that filling.

Figure 57:
Fig. 57 shows another fabric which may be produced when only one side of the machine is operated.
Figure 55:
Figure 54:
Figure 53:
Figure 52:
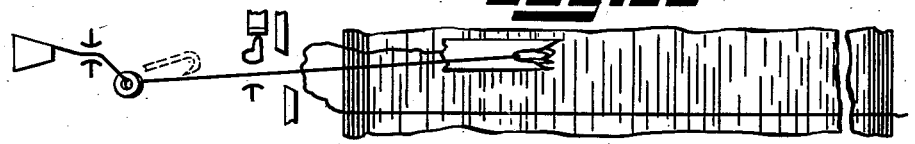

For producing the fabric of Fig. 57, the filling motion at one side of the loom must function to repeat the steps hereinabove described as following through 180° of filling cam shaft travel so that the cams on the filling cam shaft should be duplicated at the opposite side thereof or there should be double cams symmetrically disposed about a center rather than having the 180° or more dwell as they now have for producing the fabric of Fig. 56. Thus, the tape and the filling carrier are employed to insert a filling at each revolution of the main cam shaft, while the carrier at the opposite side takes that filling and completes laying thereof through the shed, once for each such revolution.

The same result is obtained by reducing the gear ratio between the main cam shaft and the filling motion cam shaft from 4:1 to 2:1 and changing the cams so they occupy twice the angular space they do according to the present showing. That permits a construction with easier cam angles and results in smoother operation.

Figure 58:
Fig. 58 is a similar view showing a modified form of fabric which results from different timing of the parts so that, instead of introducing a complete "hairpin" from one side and then one from the other side, legs of opposite hairpins are introduced in alternation.

The fabric of Fig. 58 differs in that a carrier functioning at either side of the machine to insert the initial pick of a "hairpin," and the cooperating carrier for completing the pick at the other side, do not immediately repeat their steps with the second pick of the "hairpin," but instead, the next pick is inserted at the opposite side, and so on, so that picks are inserted from alternate sides in succession. Thus the two legs of each "hairpin" are inserted in non-adjacent sheds. The filling motion cams must be altered accordingly and it will be evident to those skilled in this art that in the complete revolution of the filling cam shaft, cams may so function as to produce the cycle incidental to the weaving of this particular fabric, although it would involve cams which are slightly more complicated than those herein illustrated.

Figure 59:
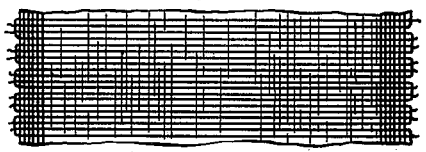
Fig. 59 is a view showing another fabric possible of production wherein legs of different "hairpins" are inserted in succession at the same side.

In Fig. 59, the insertion of a leg of a "hairpin" at one side is then followed by the insertion of two picks from the opposite side, but these two picks comprise legs of different "hairpins." In other words, the sequence involves two picks from the same side as in Fig. 56 but they are never consecutive picks which go to make up a single "hairpin" and thus the legs of each "hairpin" are separated by two picks of different "hairpins." This will be quite evident from an inspection of Fig. 59 and merely constitutes one other scheme or one other timing arrangement which may be employed.

To this point the description has been mainly devoted to the method and mechanism employed for fabric woven on a four pick cycle. It is clear as above explained that a two pick cycle may be employed if the fabric of Fig. 57 is woven with cams spread over 360° of cam shaft travel. Actually such a fabric could be more easily produced in that manner. There need be a filling motion at only one side.

Another possibility is that of utilizing a 2:1 ratio for driving the filling motion cam shaft and of employing cams at two filling motions, each set of which is of 360° extent instead of 180° active extent with 180° dwell, and similarly disposed about their centers. Then, operating on a two pick cycle, both sides may be employed to insert filling simultaneously. The carriers function to insert a pick from each side, transfer both at the center, and to extend the two picks across the fabric to lay them in the same shed. Two following picks would then be simultaneously inserted for the next shed to complete the cycle.

No attempt is made here to illustrate or describe all the fabrics which might be made on a loom constructed as herein described, or certain obvious modifications of the timing sequence thereof, but all of the fabrics would have the same general characteristics and the sequence of steps may be varied through relatively wide ranges without departing from the basic system and without modifying the basic mechanism except to increase the number of cams for controling the operations and varying the contour thereof as will be apparent to those skilled in the art.

The more detailed portion of this disclosure has made reference to "tapes" and these have been described and illustrated as being of metal in the form of flexible strips. It is to be understood that the term "tapes" in both the specification and claims includes all flexible elements by which the filling carriers may be projected into and drawn from the warp shed. These may take the form of articulated members which are wrapped about the wheels and guided into and from the shed, or may comprise other composite members the general tendency of which is to assume a straight condition, but which may be wrapped about the tape wheels, so called.

While one embodiment of the invention and certain possible modifications thereof have been disclosed, it is to be understood that the inventive concept may be carried out in a number of ways. This application is therefore not to be limited to the precise details described, but is intended to cover all variations and modifications thereof falling within the spirit of the invention and the scope of the claims.

We claim:

1. The method of inserting two connected picks of filling from a stationary supply in a loom, which comprises the steps of holding an end of the filling and presenting it to be engaged by an inserting carrier so that the said held end draws beneath the carrier and the filling running to the supply is above the carrier, then inserting the pick while first drawing from the supply until sufficient filling is available to reach across the fabric, and then holding the filling against withdrawal from the supply and releasing the end first mentioned, and thereafter, reversing the filling relationship to the inserting carrier for the second pick so that the end extending to and held by the fabric is maintained above the carrier and the filling extending to the supply lies beneath the carrier, inserting that pick by drawing from the supply until sufficient filling is available for reaching across the fabric and then cutting and binding the filling from the supply and completing the insertion of that length of material which has been drawn and cut.

2. The method of inserting two connected picks of filling from a stationary supply in a loom, which comprises the steps of holding an end of the filling and presenting it to be engaged by an inserting carrier so that the said held end lies beneath the carrier and the filling running to the supply is maintained above the carrier, then inserting the pick while first drawing from the supply until sufficient filling is available to reach across the fabric, and then holding the filling against further withdrawal from the supply and releasing the end first mentioned, and then engaging the filling for insertion of the second one of the said two connected picks after changing the shed, by reversing the relationship of the filling as it is presented to the inserting carrier so that the end extending to and held within the fabric is maintained above the carrier and the filling extending to the supply beneath the carrier, and then inserting that said pick by drawing from the supply until sufficient filling is available for reaching across the fabric, cutting and binding the filling and completing the insertion of the pick from the end thus severed from the supply.

3. The method of inserting two connected picks of filling from a stationary supply in separate sheds of a fabric being woven in a loom, which comprises the steps of inserting each pick by drawing filling from a supply and inserting it part way across the fabric by a first carrier member, then transferring that filling to a second carrier member and drawing it into the shed for the remainder of the width of the fabric while controlling the filling as it is presented to the said first inserting member so that at each pick the relatively free end thereof is maintained to draw beneath the inserting member while the other (not severed or released) end thereof is caused to lie above the said inserting member.

4. The method of inserting two connected picks of filling from a stationary supply in a loom, which comprises the steps of holding an end of the filling and presenting it to be engaged by an inserting carrier member so that the said held end is beneath the member while the filling running to the supply is above the carrier member, then inserting the pick while first drawing from the supply until sufficient filling is available to reach across the fabric, and then holding the filling against withdrawal from the supply and releasing the end first mentioned, and thereafter, changing the relationship of the said filling as it is presented to the inserting member for the second pick so that as that pick is inserted within its shed in the fabric, the end held at the fabric is maintained above the inserting carrier member and the opposite end which extends to the supply and which is to be severed, lies beneath the inserting member.

5. In a loom having means for inserting connected picks of filling from a stationary supply, the combination of a filling inserting member and a filling motion for presenting the filling to said member preparatory to its engagement and insertion thereby, said filling motion comprising means for retaining the filling adjacent the supply, a cutter and binding means for the filling between the first retaining means and the fabric, a trap adjacent said cutter and binding means and filling engaging instrumentalities between said retaining means and the cutter and binder and trap, and timed actuating means effective upon the said means and the instrumentalities to shift the control of the filling from the clamping means to the trap, thereby to reverse its relationship to the inserting means at predetermined picks.

6. In a loom having means for inserting connected picks of filling from a stationary supply, the combination of a filling inserting member and a filling motion for presenting the filling to said member preparatory to its engagement and insertion thereby, said filling motion comprising a retaining means for the filling adjacent the supply, a cutter and binding means for the filling between the first retaining means and the fabric, a trap adjacent said cutter and binding means and offset with respect thereto laterally of the normal direction of movement of filling from the supply toward the fabric, and filling engaging instrumentalities between the said retaining means and the cutter and binder and trap, and actuating means functioning in timed relationship to the movements of said inserting member and effective upon each of the retaining means, cutter and binder, trap and instrumentalities, for releasing the filling from the binder upon one pick and transferring that filling to the trap for the next pick, the position and relationship of the said parts being so disposed that in moving the filling from the clamp to the trap, its relative position with respect to the inserting means is so varied that upon a succeeding pick the end of filling coming from the supply will lie beneath the inserting means rather than above it.

7. In a loom having means for inserting connected picks of filling from a stationary supply, the combination of a filling inserting member and a filling motion for presenting the filling to said member preparatory to its engagement and insertion thereby, said filling motion comprising means for retaining an end of the filling and means for engaging the filling and deflecting it to a position to be received by the said inserting member, and other cooperating instrumentalities functioning with and in timed relationship to said inserting member and deflecting means for positioning the filling so that upon the first pick of a pair of connected picks the end of the filling released by said retaining means is positioned beneath the inserting member, and upon insertion of the second pick thereof, the supply end of the filling is positioned beneath said inserting member.

8. In a loom having means for inserting connected picks of filling from a stationary supply, the combination of a filling inserting member and a filling motion for presenting the filling to said member preparatory to its engagement and insertion thereby, said filling motion comprising a binder for retaining the filling adjacent the supply, a combined cutter and binder means for the filling positioned between the first binder and the shed of the fabric into which said inserting means functions, a trap adjacent the said cutter and binding means offset with respect to the general direction of movement of the filling from the supply to the shed in which it is to be inserted, a filling engaging eye and a filling depressor, and means for actuating said eye and depressor to guide the filling after it is released from the clamp and cutter during the first pick, so that it is engaged within said trap after being presented to the inserting means in such manner that the cut and clamped end lies at the bottom of the inserting member, and means for further operating said eye and depressor at a succeeding pick to present the filling to the inserting member so that the supply end thereof lies beneath that member.

9. In a loom of the type having a stationary filling supply, the combination of a loom frame, movable filling carriers, a lay and reed, and means to impart movement to said lay and reed and to retain them in stationary position in alignment with the path of movement of said filling carriers, and a filling motion adjacent the path of each carrier, said filling motion comprising a cam shaft, cams on said shaft, filling engaging instrumentalities and follower means for imparting movements from said cams to the instrumentalities, a supporting means for said cam shaft, cams, instrumentalities and follower comprising an enclosing housing and means by which said housing may be attached to said loom frame and removed therefrom as a unit, and drive means for rotating said cam shaft in timed relationship to the movement of said carriers and lay.

10. In a loom of the type having a stationary filling supply, the combination of a loom frame, movable filling carriers, flexible tapes to which the carriers are attached and drive means for said tapes, a lay and reed, and cam means for imparting beat-up movements to the lay and reed and for maintaining them stationary during the period of time in which the tapes and carriers move along the lay to insert filling, and a filling motion adjacent the path of each carrier, said filling motion comprising a cam shaft, cams on said shaft, filling engaging instrumentalities and follower means for imparting movements from said cams to the instrumentalities, a supporting means for said cam shaft, cams, instrumentalities and follower comprising an enclosing housing and means by which said housing may be attached and removed as a unit, and drive means coupled to a rotating part of said loom and extending into said housing and being geared to said cam shaft within the housing for rotating said cam shaft in timed relationship to the movement of said carriers and lay.

11. A filling motion for a loom of the type having a stationary filling supply which comprises a support for the filling, means for retaining said filling in position to be engaged by an inserting means, a binder and cutter for the filling, a trap for the filling offset with respect to said binder and cutter, and a depressor for engaging the filling between the retaining means and the binder and cutter and trap operable for positioning the filling for engagement by the inserting means, and means for actuating the said retaining means, the binder and cutter, the trap and the depressor in timed relationship to movements of the inserting means which comprises a cam shaft, a plurality of cams independently adjustable on said cam shaft and rotatable therewith, drive means for the said shaft and a plurality of actuating members engageable with the said cams and interconnected to the retaining means, binder and cutter, trap and depressor for actuating them in properly timed relationship.

12. A filling motion for a loom of the type having a stationary filling supply which comprises means for retaining said filling in position to be engaged by an inserting means and for controlling the filling, said means comprising a retaining member adjacent the filling, a binder and cutter between said retaining member and the shed of a fabric into which said filling is to be inserted, a trap offset with respect to said clamp and cutter and adjacent thereto, a filling guiding eyelet and a depressor hook engageable with the filling for moving it to be engaged by the inserting member, and means for actuating said filling controlling means in timed relationship to the movements of the inserting means which comprises a cam shaft, a plurality of independently adjustable cams fixed to said shaft, means for rotating said shaft in timed relationship to the movements of said loom and a plurality of tappets, one for each cam on said shaft, for transmitting motion from their respective cams to the respective parts of said filling motion to be controlled thereby, one said tappet being interconnected for controlling the filling retaining means adjacent the supply, two of said tappets being interconnected to the depressor hook for imparting a compound movement thereto, the other of said tappets being interconnected to the clamp and cutter and trap for actuating them, and an extension functioning from the movement of parts controlled by said last mentioned tappet for imparting movement to the filling guiding eye.

13. In a filling motion for looms wherein filling is inserted from a stationary supply, a depressor member for moving the filling to a position to be engaged by an inserting carrier, and means for imparting a compound movement to said depressor member for moving it to engage the filling and to draw it downwardly beneath the inserting carrier.

14. In a filling motion for looms wherein filling is inserted from a stationary supply, a depressor member for moving the filling to a position to be engaged by an inserting carrier, and means for imparting a compound movement to said depressor member, said means comprising a cam shaft, driving means for said cam shaft, cams on said shaft and means functioning from said cams including two angularly disposed lever arms, one said lever arm being directly connected to said depressor member and the other being connected thereto through a link angularly disposed to the first arm.

15. In a filling motion for looms wherein filling is inserted from a stationary supply, a depressor member for moving the filling to a position to be engaged by an inserting carrier comprising a hook having two pivot points spaced thereon, and means for imparting a compound movement to said depressor member which comprises a cam shaft, means for driving said cam shaft, cams on said shaft and tappets engageable with said cam means for imparting movement therefrom to the said depressor member, and means for interconnecting said tappets with the said depressor member which comprises pivoted levers having arms engageable with their respective tappets, one of the other arms of one of the levers being directly connected to a pivot point thereof, while the remaining arm of the other lever is connected thereto by an intermediate connecting link.

16. In a filling motion for looms wherein filling is inserted from a stationary supply, a depressor member for moving the filling to a position to be engaged by an inserting carrier, and means for imparting a compound movement to said depressor member for engaging the filling and moving it laterally and downwardly simultaneously, thereby to position a stretch of filling in the pathway of the carrier and a continuing length thereof beneath the carrier.

17. A filling motion for looms having filling inserting means functioning to insert filling from a stationary supply, said filling motion being adapted to present that filling to the inserting means differently at successive picks and comprising the combination with a filling inserting means having a carrier in which the filling is engaged within a vertically disposed notch, of a filling binder adjacent the supply, two filling retaining and guiding means between a point at which the filling is first received within the notch in said carrier and the shed of a fabric into which the filling is to be inserted, said means being positioned above the path of said carrier, one in substantial vertical alignment with the inserting means and the other offset with respect thereto, and a filling guiding eye and depressor for shifting the filling laterally to align with a selected one of the said two filing retaining means and for depressing it downwardly beneath the inserting means.

18. A filling motion for looms having filling inserting means functioning to insert filling from a stationary supply, said filling motion being adapted to present that filling to the inserting means differently at successive picks and comprising the combination with a filling inserting means having a carrier in which the filling is engaged within a vertically disposed notch, of a filling binder adjacent the supply, a filling retaining binder and cutter, and cooperating therewith, a filling trap positioned between a point at which the filling is first received within the notch in said carrier and the shed of a fabric into which the filling is to be inserted, said binder and cutter and trap being positioned above the path of said carrier, the trap being in substantial vertical alignment with the plane of movement of the inserting means while the said binder and cutter are offset with respect thereto, a filling guiding eye and a depressor, and means for moving said eye to align the filling with either the trap or the binder and cutter, and other means for actuating the depressor to engage and move the filling downwardly so as to place it in the pathway of the inserting means.

19. In a filling motion for looms having filling inserting means functioning to insert filling from a stationary supply and adapted to present that filling to the inserting means in a generally vertical relationship and reversely at successive picks, the combination of a filling binder and cutter and a cooperating and interconnected filling trap and means for simultaneously closing the trap as the binder and cutter are opened, said means functioning upon reverse movement to close the binder and cutter and to release the trap.

20. In a filling motion for looms having filling inserting means functioning to insert filling from a stationary supply and adapted to present that filling to the inserting means differently at successive picks, the combination of a filling binder and cutter and a cooperating filling trap and a common means for actuating both the binder and cutter and the trap, said means being effective for opening the binder and cutter and simultaneously closing the trap when moved in one direction, but when moved in the opposite direction, being effective for opening the trap and closing the binder and cutter.

21. A filling motion for looms having filling inserting means functioning to insert filling from a stationary supply and adapted to present that filling to the inserting means in a generally vertical relationship and reversely at successive picks, the combination of a filling binder and cutter and a cooperating interconnected filling trap, said binder and cutter and trap being laterally spaced transversely of the general direction of movement of the filling, and a filling guiding eyelet through which the filling is threaded and means for simultaneously opening the trap and closing the binder and cutter and for closing the trap and simultaneously opening the binder and cutter, said means further being effective to move said eyelet through which the filling is threaded laterally of the general direction of filling movement toward the shed of a fabric into which it is to be inserted coincidentally with the operation of the binder and cutter thereby to guide the filling to and from the trap and the binder and cutter.

22. A filling motion for looms having filling inserting means functioning to insert filling from a stationary supply and adapted to present that filling to the inserting means in differing relationship at successive picks, the combination of a filling binder and cutter and a cooperating filling trap, said binder and cutter and trap being disposed in substantially the same plane transversely of the general direction of movement of the filling, the trap being laterally spaced from the binder and cutter which are in substantial alignment with the direction of movement of the filling, a filling guiding eyelet through which the filling is threaded and a depressor periodically engageable with the filling adjacent the eyelet, means for moving said depressor to and from a position to engage and depress the filling to extend a portion thereof into the path of the filling inserting means, and other operating means for simultaneously opening the trap and closing the binder and cutter and for closing the trap and simultaneously opening the binder and cutter, said means further being effective to move said eyelet through which the filling is threaded laterally of the general direction of filling movement toward the shed of a fabric into which it is to be inserted coincidentally with the operation of the binder and cutter thereby to guide the filling to and from the trap and the binder and cutter.

23. In a filling motion for looms having a filling inserting carrier functioning to insert filling from a stationary supply, the combination of a binder and cutter and a filling trap offset laterally with respect to the general plane of movement of the inserting carriers and positioned above the path of movement thereof, and a filling depressor movable to and from a filling engaging position, and means for moving said depressor into engagement with the filling and to a position to extend the filling downwardly into the path of the carrier.

24. In a filling motion for looms having a filling inserting carrier functioning to insert filling from a stationary supply, the combination of a binder and cutter and a filling trap offset laterally with respect to the general plane of movement of the inserting carriers and positioned above the path of movement thereof, an eyelet above the pathway of the carrier through which the filling is threaded and a filling depressor movable to and from a filling engaging position, and means functioning periodically and in timed relation to the movements of the carrier for moving said depressor into engagement with the filling and to a position to extend the filling downwardly into the path of the carrier, and other means for moving the eyelet to and from substantially vertically aligned and offset positions with respect to the pathway of the carrier, thereby to vary the position of the filling between the eyelet and depressor so that for one pick the carrier engages filling stretched between those instrumentalities and for a succeeding pick that stretch of filling is maintained out of the pathway of the said carrier.

25. In a shuttleless loom of the type described, the combination of a tape and a filling carrier fixed to said tape, a wheel to which said tape is connected and means for oscillating said wheel to move said tape and carrier into and from the shed of a fabric, an enclosing means for the wheel and tape and tape guiding means spaced circumferentially of the enclosing means, said means comprising antifriction bearings, and means on which said bearings are adjustably maintained at a distance radially spaced from the wheel so as to maintain the tape in substantial contact with the wheel, said means comprising eccentrically disposed axis members for the bearings and means by which said members are locked in an adjusted position.

26. Mechanism as defined in claim 25 wherein the means on which said bearings are adjustably maintained comprises studs eccentrically disposed to bolts by which the studs are fixedly held in an adjusted position.

27. In a tape loom of the type described, the combination of a tape and a filling carrier fixed to said tape, a wheel to which said tape is connected and means for oscillating said wheel to move said tape and carrier into and from the shed of a fabric, an enclosing means for the wheel and tape and bearing means spaced circumferentially of the enclosing means and in engagement with the tape, and guide means tangentially disposed with respect to said tape wheel for guiding said tape in its movements from the wheel into the shed of the fabric and from the shed back to the wheel, said guiding means comprising a flat surface having channelled guide means at either edge upon and within which said tape is constrained to move, and supplementary guiding means adjacent the end of said tangential guide means comprising freely rotatable rollers, one at either side of said tape and adapted to bear against the edges thereof, and other rotating guide rollers positioned above said tape for bearing downwardly thereon and for maintaining it downwardly toward the base of the tangentially disposed, channelled guideway.

28. In a tape loom of the type described, the combination of a tape and a filling carrier fixed to said tape, a wheel to which said tape is connected and means for oscillating said wheel to move said tape and carrier into and from the shed of a fabric, tangentially disposed guide means for the tape between said tape wheel and the shed of a fabric to and from which said tape and tape head are moved by said wheel, said guide means comprising a horizontally disposed flat channelled member, within which said tape is constrained to move, antifriction roller members positioned laterally of the tape for bearing against the sides thereof and means in which said antifriction roller members are mounted for adjustment laterally with respect to the pathway of the tape movements.

29. Mechanism as defined in claim 28 wherein said antifriction roller members which bear against the lateral edges of the tape are mounted on eccentrically disposed retaining members thereby to be adjusted laterally of the tape movement, and locking means for said eccentrically mounted retaining members for holding them in an adjusted position.

30. In a tape loom of the type described, the combination of a loom frame, a tape and a filling carrier fixed to said tape, a wheel to which said tape is connected and means for oscillating said wheel to move said tape and carrier into and from the shed of a fabric, a rectilinear guide means disposed tangentially of the wheel to guide the tape from the wheel toward the fabric, a common support for said wheel and guide means and means by which said support is attached to the loom frame, said means being movable along said attaching means thereby to adjust the position of the support, tape, wheel and tape guide means as a unit.

31. In a tape loom of the type described, the combination of a loom frame, a tape and a filling carrier fixed to said tape, a wheel to which said tape is connected and means for oscillating said wheel to move said tape and carrier into and from the shed of a fabric, a rectilinear guide means disposed tangentially of the wheel to guide the tape from the wheel toward the fabric, a support for said wheel and a member attached to said support upon which the said guide means is mounted, and connecting means between said member and support and between said member and guide means by which the latter may be adjusted relatively to said wheel and tape.

32. In a tape loom of the type described, the combination of a loom frame, a tape and a filling carrier fixed to said tape, a wheel to which said tape is connected and means for oscillating said wheel to move said tape and carrier into and from the shed of a fabric, a rectilinear guide means disposed tangentially of the wheel to guide the tape from the wheel toward the fabric, a support for said wheel and a member attached to said support upon which the said guide means is mounted, connecting means between said member and support by which it may be adjusted laterally of the wheel and tape and other connecting means between the member and guide means by which the latter may be adjusted within the plane of the wheel and tape.

33. In a tape loom of the type described, the combination of a loom frame, a tape and a filling carrier fixed to said tape, a wheel to which said tape is connected and means for oscillating said wheel to move said tape and carrier into and from the shed of a fabric, a rectilinear guide means disposed tangentially of the wheel to guide the tape from the wheel toward the fabric, a common support for the wheel and guide means and means by which said common support is attached to the loom frame and by which it is adjustable bodily to position the wheel, tape and guide as a unit, a member attached to said common support upon which the said guide means is mounted, and connecting means between said member and support and between said member and guide means by which the latter and the tape may be adjusted independently of the adjustment of the parts as a unit.

34. In a tape loom of the type described, the combination of a loom frame, a lay and lay motion by which said lay is held stationary for a part cycle, a tape and a filling carrier fixed to said tape, a wheel to which said tape is connected and means for oscillating said wheel to move said tape and carrier into and from the shed of a fabric, a rectilinear guide means disposed tangentially of the wheel to guide the tape from the wheel toward the fabric, a common support for said wheel and guide means and means by which said support is attached to the loom frame, said means comprising a slide inclined at an angle substantially parallel to the direction of the lay when it is held stationary for insertion of the filling.

35. In a thread binder for a loom filling motion, a means defining an aperture through which the thread is drawn, said aperture having a conical inlet and a conical outlet portion, a cooperating cone-shaped plug for engagement within the conical outlet portion of the aperture, spring means for maintaining said means defining the aperture and the plug in separated relationship so that the thread may pass freely through the binder, and positively actuated means engageable with one of said members for pressing the means defining the aperture and the plug together against the tension of said spring, thereby to bind the thread.

36. In a thread binder for a loom filling motion, a supporting member having a conical plug centrally disposed with respect thereto and an eyelet through which a thread may be guided in parallelism with the conical surface of said plug, a cooperating collar guided for movement axially of said conical plug and having a conical aperture therein concentrically disposed with respect to the plug, spring means for urging the collar out of engagement with the plug and positively actuated means for pressing the conical surface of the collar into engagement with the plug thereby to bind the yarn.

37. In a shuttleless loom of the type described, a lay and tapes, one at each end of the lay for simultaneous movement across the lay, a filling carrier at the end of each tape positioned for movement with the tape toward and from the center of the lay for inserting a filling thread part way into a warp shed on the lay, transferring the thread from one carrier to the other and for drawing it through the remaining part of the shed, one of said carriers being smaller than the other thereby to enter it at transfer, the said smaller carrier having its lower portion in line with the lower edge of the tape to which it is fixed so it bears against a portion of the lay on which it slides, the larger carrier having its lower central portion cut away and its sides extending down to terminate in lower edges in alignment with the tape to which it is fixed to permit entry of the smaller carrier while both tapes and carriers are supported by the lay throughout substantially the entire length thereof which overlies the lay.

38. In a shuttleless loom the combination of a pair of opposed flexible tapes and filling carriers fixed thereto, said carriers being of box-like construction and one being of smaller cross section than the other so that at transfer at the extremity of their stroke it may enter the said other carrier, the larger carrier being cut away at its lower central portion to permit entry of the smaller while both carriers are supported by the lay throughout substantially their entire length.

39. In a loom of the type to function from a stationary source of filling, the combination of opposed filling carriers and reciprocable means to which the carriers are attached for projecting them into and from a warp shed in a fabric being woven, said carriers being of general box section one of which is of smaller cross section than the other so that at transfer at the extremity of their stroke it may enter the said other carrier, each said carrier having its lateral side members extending throughout substantially the entire length of the said carrier and terminating at a point tapered to approximately the vertical center of the carrier, the remaining external portion of the said carriers being constituted as relatively straight, smooth surfaces so that in passing through the warp threads, the latter may not become engaged with any of the internal parts or surfaces of the said carriers.

40. A filling carrier for looms functioning to insert filling from a stationary supply which comprises a box-like, external shell structure having a top portion and lateral sides between which is retained a filling gripper, each of the lateral sides of the carrier extending forwardly of the gripper and terminating in tapered, substantially centrally disposed points to facilitate passage of the carrier through the warp threads while shielding the gripper from engagement thereby.

41. A filling carrier for looms functioning to insert filling from a stationary supply which comprises in combination a box-like, external shell structure having top and lateral sides, a filling gripper formed as a portion of the top side, the lateral sides of the carrier extending forwardly of the gripper and terminating in tapered, substantially centrally disposed points to facilitate passage of the carrier through the warp threads, and the top side of the carrier being relatively smooth and flush with gripper parts formed as a portion thereof.

42. In a shuttleless loom the combination of a pair of opposed flexible tapes and a filling carrier fixed to each tape, said carriers being of box-like construction and one being of smaller cross section than the other so that at transfer at the extremity of their stroke it may enter the said other carrier, each said carrier having its lateral side members extending throughout substantially the entire length of the said carrier and tapering back to merge with the tape to which it is attached, the point of each side member being tapered down to a point at approximately the vertical center of the carriers, the remaining external portions of the said carriers being constituted as relatively straight, smooth surfaces so that in passing through the warp threads, the latter may not enter or be unintentionally engaged by any parts of the said carriers.

43. In a shuttleless loom the combination of filling carriers for inserting a filling thread, transferring it from one head to another and drawing it through a warp shed, said carriers being so devised that one enters the other to effect transfer, each said carrier having a thread receiving notch and a gripper, the notch and gripper of one being in substantial vertical alignment so that thread received by the carrier enters both, the other carrier having its gripper aligned with the notch and gripper of the carrier first mentioned, while the notch thereof has its entrance offset to one side of its gripper the notch then being directed to the rear and behind the said gripper, and the gripper of one carrier being superimposed above that of the other.

44. In a shuttleless loom the combination of filling carriers for inserting a filling thread, transferring it from one head to another and drawing it through a warp shed, said carriers being of box-like construction and one carrier being smaller than the other thereby to enter it at the transfer point, each said carrier having a thread receiving notch and a transfer gripper, the notch and gripper of one being in substantial vertical alignment so that thread received by the carrier enters both, the other carrier having its gripper aligned with the gripper and notch of the carrier first mentioned while the notch thereof has its entrance offset laterally to one side of its gripper the notch then being directed to the rear and behind the said gripper, and the gripper of one carrier being superimposed above the other.

45. In a shuttleless loom the combination of filling carriers for inserting a filling thread, transferring it from one head to another and drawing it through a warp shed, said carriers being of box-like construction and one being of smaller cross section than the other thereby to enter it at the transfer point, each said carrier having its lowermost surfaces in direct alignment with the lower edge of the tape to which it is attached thereby to bear against the support at the lay throughout its entire movement thereon, the larger carrier being cut away centrally at its lowermost side thereby to permit entry of the smaller carrier while that smaller carrier is directly supported by and in contact with the adjacent portion of the lay, each said carrier having a thread receiving notch and a transfer gripper, the notch and gripper of one being in substantial vertical alignment so that thread received by the carrier enters both, the other carrier having its gripper aligned with the gripper and notch of the carrier first mentioned while the notch thereof has its entrance offset laterally to one side of its gripper, the notch then being directed to the rear and behind the said gripper, and the gripper of one carrier being superimposed above the other.

46. For a carrier for use in a loom of the type in which filling is drawn from a stationary supply, a filling transfer gripper comprising a hook and a guide defining between them a thread receiving notch, and a trapping means between said hook and guide so devised as to permit ready entrance of a thread, but directed inwardly of the notch and overlapping the guide to prevent reverse movement of the thread.

47. For a carrier for use in a loom of the type in which filling is drawn from a stationary supply, a filling transfer gripper comprising a hook and a guide defining between them a thread receiving notch, and a trapping means between said hook and guide extending inwardly of the notch and being attached to one of said members and overlapping the other to permit ready entry of the thread but restraining it against withdrawal.

48. For a carrier for use in a loom of the type in which filling is drawn from a stationary supply, a filling transfer gripper comprising a hook and a guide defining between them a thread receiving notch, a groove at the hook side of the guide and a barb fixed to said hook and extending along the guide into said groove to permit ready entry of a thread, but to restrain it against withdrawal.

49. A filling carrier for shuttleless looms comprising a box-like structure having top and lateral sides, a notch in the top side of the carrier and a gripper cooperating with said notch and comprising a hook and a guide defining between them a thread receiving notch, and a trapping means between said hook and guide extending inwardly of the notch and being attached to one of said members and overlapping the other to permit ready entry of the thread but restraining it against withdrawal.

50. A gripper as defined in claim 47 in which a soft friction material is positioned within the notch between the hook and guide to retard movement of an entrapped thread therethrough.

51. A method of introducing filling threads to cooperating carriers of a tape loom and of transferring a filling thread from one to another which comprises the steps of feeding a thread into a combined notch and entrapping gripper member of one carrier and then transferring it to the other carrier by engaging an entrapping gripper member of a second carrier with the thread held in the first carrier and pulling it lengthwise through the first entrapping gripper member, then feeding a thread to a retaining notch only in the second carrier and engaging it within the entrapping gripper member of the first carrier whereby it may be directly withdrawn from the second head and pulled through the shed.

52. A method of introducing filling threads to a carrier of a shuttleless loom and of transferring it from that carrier to a second and cooperating carrier which comprises the steps of feeding a thread into a combined notch and entrapping gripper member of the first carrier and then engaging the thread as it extends between the notch and entrapping gripper member of the first carrier by an entrapping gripper member of the second carrier and then drawing a free end of the thread lengthwise through the first gripper member while holding the opposite end.

53. In a filling motion for looms which function to insert filling from a stationary supply, the combination of a thread binder and cutter and a cooperating trap, said trap comprising a thread confining member and an abutment against which said member is engaged to complete the trapping of a filling thread, said member having a part thereof upon which the thread rests tapered in a direction to permit the thread to slip therefrom when the trap is released.

54. In a filling motion for looms which function to insert filling from a stationary supply, the combination of a thread binder and cutter and a cooperating trap adjacent thereto, said trap comprising a pointed member which forms part of a notch within which a filling thread may be engaged, and an abutment against which said pointed member is engaged to complete the trapping of said filling thread, the pointed portion of said notched member being tapered toward the point so that when the trap is released, the filling thread supported thereby may slip therefrom.

55. In a shuttleless loom the combination of tapes, a filling carrier at one end of each tape, tape wheels to each of which the other end of a tape is attached, a constantly rotated cam shaft and means including an eccentric at each end of the cam shaft, an eccentric rod, a rocker shaft, gears for interconnecting the rocker shaft and tape wheel and a rack at the end of said eccentric rod meshing with a pinion fixed to said rocker shaft, and an angularly adjustable connection between said cam shaft and the eccentric means carried thereby for adjusting the timing of its respective tape and filling carrier.

56. Mechanism as defined in claim 55 wherein the eccentric means at the cam shaft ends comprises an eccentric sheave freely mounted on the shaft, a strap and rod carried upon said sheave, and a sector fixed for rotation with the shaft and adjustably interconnected with the sheave for rotating the latter as the shaft is turned.

57. In a shuttleless loom the combination of tapes, a filling carrier at one end of each tape, tape wheels to each of which the other end of a tape is attached, a constantly rotated cam shaft and means including an eccentric at each end of the cam shaft, an eccentric rod, a rocker shaft, gears for interconnecting the rocker shaft and tape wheel and a rack at the end of said eccentric rod meshing with a pinion fixed to said rocker shaft, and means including an adjustable intermediate portion of the eccentric rod for varying the distance from the eccentric means to the rack for independently setting each tape wheel and tape.

58. Mechanism as defined in claim 57 wherein the rack is slidable within an eccentric bushing and means to adjust said bushing to vary the position of the rack with respect to the pinion and to effect proper meshing of the teeth thereof.

59. In a shuttleless loom the combination of tapes, a filling carrier at one end of each tape, tape wheels to each of which the other end of a tape is attached, a constantly rotated cam shaft and means including an eccentric at each end of the cam shaft, an eccentric rod, a rocker shaft, gears for interconnecting the rocker shaft and tape wheel and a rack at the end of said eccentric rod meshing with a pinion fixed to said rocker shaft, and an angularly adjustable connection between said cam shaft and the eccentric means carried thereby for adjusting the timing of its respective tape and filling carrier, and means including an adjustable intermediate portion of the eccentric rod for varying the distance from the eccentric means to the rack for setting each tape wheel and tape independently of the other and of the adjustment effected at the cam shaft and eccentric means thereon.

60. A filling motion for a loom of the type having a stationary filling supply which comprises a support for the filling, means for retaining said filling in position to be engaged by an inserting carrier which comprises a first binder through which the filling is always threaded, a second and spaced binder having a thread cutter cooperating therewith and a filling depressor functioning upon the filling between the said first binder and binder and cutter, and means for actuating said means for retaining the filling in timed relationship to the movements of the inserting means which comprises a cam shaft, a plurality of cams independently adjustable on said shaft, drive means for the shaft and interconnecting actuators for transmitting movement from the cams to each of the aforesaid means including the first binder, second binder and cutter and the depressor.

61. For a filling motion of unitary type for a shuttleless loom operating from a stationary source of filling, the combination of instrumentalities for guiding and controlling filling to present it to carriers movable with flexible, reciprocating tapes, a cam shaft for said filling motion, means to rotate said cam shaft in timed relation to the reciprocations of said tapes and filling carriers, and a plurality of cams on said shaft, said cams being readily removable for substitution of other cams, and means individual to each cam for angularly adjusting it upon said shaft which comprises flattened shoulders on the shaft and adjusting screws passing through a portion of the cams and engageable with the said shoulders.

62. Mechanism as defined in claim 61 wherein the cams in addition to being angularly adjustable, are further adjustable to vary their contours.

63. Mechanism as defined in claim 61 wherein certain of the cams are provided with supplementary cam parts and means to adjust said parts circumferentially thereby to vary the effective contours of said cams.

WALTER J. BUDZYNA.
MAURICE R. FLAMAND.

REFERENCES CITED

The following references are of record in the file of this patent:

UNITED STATES PATENTS

| Number | Name | Date |
|---|---|---|
| 186,824 | Gartenmann | Jan. 30, 1877 |
| 449,336 | Skinner | Mar. 31, 1891 |
| 681,004 | Skinner | Aug. 20, 1901 |
| 1,103,329 | Vales | July 14, 1914 |
| 1,492,492 | Talbot | Apr. 29, 1924 |
| 1,805,046 | Menschner | May 12, 1931 |
| 1,883,354 | Dreyfus | Oct. 18, 1932 |
| 2,012,121 | Dickie | Aug. 20, 1935 |
| 2,106,727 | Drobile | Feb. 1, 1938 |
| 2,151,085 | Dewas | Mar. 21, 1939 |
| 2,191,376 | Gabler | Feb. 20, 1940 |
| 2,226,069 | Nadeau | Dec. 24, 1940 |
| 2,399,728 | Fletcher | May 7, 1946 |
| 2,483,987 | Tuten | Oct. 4, 1949 |
| 2,553,351 | Belotti | May 15, 1951 |

FOREIGN PATENTS

| Number | Country | Date |
|---|---|---|
| 342,253 | Great Britain | Jan. 23, 1931 |
| 424,966 | Great Britain | Feb. 28, 1935 |
| 453,618 | Great Britain | Sept. 15, 1936 |
| 855,972 | France | Mar. 4, 1940 |